US012720101B2

(12) United States Patent
Yu et al.

(10) Patent No.: US 12,720,101 B2
(45) Date of Patent: Aug. 25, 2026

(54) MOTION VECTOR DIFFERENCE DERIVATION

(71) Applicant: Telefonaktiebolaget LM Ericsson (publ), Stockholm (SE)

(72) Inventors: Ruoyang Yu, Täby (SE); Kenneth Andersson, Gävle (SE); Jacob Ström, Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 135 days.

(21) Appl. No.: 18/726,034

(22) PCT Filed: Dec. 22, 2022

(86) PCT No.: PCT/EP2022/087576
§ 371 (c)(1),
(2) Date: Jul. 1, 2024

(87) PCT Pub. No.: WO2023/131546
PCT Pub. Date: Jul. 13, 2023

(65) Prior Publication Data

US 2025/0142108 A1 May 1, 2025

Related U.S. Application Data

(60) Provisional application No. 63/296,268, filed on Jan. 4, 2022.

(51) Int. Cl.
*H04N 19/513* (2014.01)
*H04N 19/105* (2014.01)
(Continued)

(52) U.S. Cl.
CPC ......... *H04N 19/513* (2014.11); *H04N 19/105* (2014.11); *H04N 19/139* (2014.11); *H04N 19/176* (2014.11)

(58) Field of Classification Search
CPC .. H04N 19/105; H04N 19/439; H04N 19/176; H04N 19/513
See application file for complete search history.

(56) References Cited

U.S. PATENT DOCUMENTS 10,701,392 B2 6/2020 Hsu
2006/0002472 A1* 1/2006 Mehta .................... H04N 19/51 348/E5.066

(Continued)

FOREIGN PATENT DOCUMENTS

WO 2020/141962 A1 7/2020

OTHER PUBLICATIONS

International Search Report and Written Opinion issued in International Application No. PCT/EP2022/087576, dated Mar. 15, 2023 (12 pages).

(Continued)

*Primary Examiner* — Jeremiah C Hallenbeck-Huber
(74) *Attorney, Agent, or Firm* — Rothwell, Figg, Ernst & Manbeck, P.C.

(57) ABSTRACT

Methods and apparatuses for processing (e.g., decoding) a current block within a current picture. The processing may include decoding partial motion vector difference (MVD) information from a coded video bitstream. The processing may include determining first and second motion vector predictors (MVPs). The processing may include determining complete MVD information using the partial MVD information and one or more of the first and second MVPs. Determining the complete MVD information may include using the partial MVD information to generate a set of MVD hypothesis pairs, and each of the MVD hypothesis pairs may include a possible first MVD and a possible second MVD. The processing may include determining first and second (Continued)

final prediction blocks of the current block using the complete MVD information and the first and second MVPs.

18 Claims, 17 Drawing Sheets

(51) Int. Cl.
*H04N 19/139* (2014.01)
*H04N 19/176* (2014.01)

(56) References Cited

U.S. PATENT DOCUMENTS

2011/0109796 A1* 5/2011 Subedar ................. H04N 7/014 348/E7.003
2014/0169472 A1* 6/2014 Fludkov ................. H04N 19/42 375/240.16
2015/0373370 A1* 12/2015 Rapaka .................. H04N 19/52 375/240.02
2016/0156970 A1* 6/2016 Yi ........................ H04N 19/513 380/217
2018/0278951 A1* 9/2018 Seregin .................. H04N 19/70
2019/0141346 A1* 5/2019 Wennersten ........... H04N 19/46
2019/0261018 A1 8/2019 Bordes et al.
2019/0289317 A1* 9/2019 Hsu ...................... H04N 19/139
2020/0128258 A1* 4/2020 Chen .................... H04N 19/139
2020/0382808 A1* 12/2020 Mullakhmetov .... H04N 19/567
2021/0112268 A1* 4/2021 Ko ....................... H04N 19/513
2021/0250580 A1* 8/2021 Chen .................... H04N 19/105
2022/0116588 A1 4/2022 Moon et al.

OTHER PUBLICATIONS

J. Chen et al., "Algorithm Description of Joint Exploration Test Model 7 (JEM 7)", Joint Video Exploration Team (JVET) of ITU-T SG 16 WP 3 and ISO/IEC JTC 1/SC 29/WG 11—7th Meeting, Torino, Italy, Jul. 13-21, 2017, Document No. JVET-G1001-v1 (48 pages).

* cited by examiner

MOTION VECTOR DIFFERENCE DERIVATION

CROSS REFERENCE TO RELATED APPLICATION

This application is a 35 U.S.C. § 371 National Phase Entry Application from PCT/EP2022/087576, filed Dec. 22, 2022, designating the United States which claims priority to U.S. provisional patent application No. 63/296,268, filed Jan. 4, 2022, the disclosures of which are incorporated herein by reference in their entirety.

TECHNICAL FIELD

This disclosure relates to video encoding and/or decoding of a picture or a video sequence.

BACKGROUND

Video and Picture

A video sequence consists of a series of pictures (also referred to as "images" herein). In the Versatile Video Coding (VVC) standard, each picture is identified with a picture order count (POC) value.

Components

Each component can be described as a two-dimensional rectangular array of sample (also referred to as "pixel" herein) values. It is common that each picture consists of three components: one luma component Y where the sample values are luma values and two chroma components Cb and Cr where the sample values are chroma values.

It is also common that the dimensions of the chroma components are smaller than the luma components by a factor of two in each dimension. For example, the size of the luma component of an HD picture would be 1920×1080 and the chroma components would each have the dimension of 960×540. Components are sometimes referred to as color components.

Coding Unit and Coding Block

A block is one two-dimensional array of samples. In video coding, each component is split into blocks, and the coded video bitstream consists of a series of coded blocks. It is common in video coding that pictures are split into units that cover a specific area of the picture.

Each unit consists of all blocks from all components that make up that specific area and each block belongs fully to one unit. The coding unit (CU) in VVC is an example of units. In VVC, the CUs may be split recursively to smaller CUs. The CU at the top level is referred to as the coding tree unit (CTU).

A CU usually contains three coding blocks, e.g., one coding block for luma and two coding blocks for chroma. The size of luma coding block is the same as the CU.

In the current VVC (i.e., version 1), the CUs can have size of 4×4 up to 128×128.

Parameter Sets, Slice Headers, and Picture Headers

VVC specifies three types of parameter sets: the picture parameter set (PPS), the sequence parameter set (SPS), and the video parameter set (VPS). The PPS contains data that is common for a whole picture, the SPS contains data that is common for a coded layer video sequence (CLVS), and the VPS contains data that is common for multiple CLVSs (e.g., data for multiple layers in the bitstream).

The concept of slices divides the picture into independently coded slices, where decoding of one slice in a picture is independent of other slices of the same picture. Each slice has a slice header comprising syntax elements. Decoded slice header values from these syntax elements are used when decoding the slice.

In VVC, a coded picture contains a picture header. The picture header contains parameters that are common for all slices of the coded picture.

Intra Prediction

In intra prediction, also known as spatial prediction, a block is predicted using the previous decoded blocks within the same picture. The samples from the previously decoded blocks within the same picture are used to predict the samples inside the current block.

A picture consisting of only intra-predicted blocks is referred to as an intra picture.

Inter Prediction

In inter prediction, also known as temporal prediction, blocks of the current picture are predicted using blocks from previously decoded pictures. The samples from blocks in the previously decoded pictures are used to predict the samples of the current block.

A picture that allows inter-predicted block is referred to as an inter picture. The previous decoded pictures used for inter prediction are referred to as reference pictures.

The location of the referenced block inside the reference picture is indicated using a motion vector (MV). Each MV consists of x and y components, which represent the displacements between current block and the referenced block in x or y dimension. The value of a component may have a resolution finer than an integer position. When that is the case, a filtering (typically interpolation) is done to calculate values used for prediction. FIG. 1 shows an example of a MV for the current block C. In the example, the MV=(2,1) indicates that the referenced block can be found two steps to the right and one step down compared to the position of the current block.

An inter picture may use several reference pictures. The reference pictures are usually put into two reference picture lists, L0 and L1. The reference pictures that are output before the current picture are typically the first pictures in L0. The reference pictures that are output after the current picture are typically the first pictures in L1.

Inter predicted blocks can use one of two prediction types, uni- and bi-prediction. Uni-predicted block predicts from one reference picture, either using L0 or L1. Bi-prediction predicts from two reference pictures, one from L0 and the other from L1. FIG. 2 shows an example of the prediction types.

Fractional MVs, Interpolation Filter, and MV Rounding

The value of the MV's x or y component may corresponds to a sample position that has finer granularity than integer (sample) position. Those positions are also referred to as fractional (sample) positions.

In VVC, the MV can be at $1/16$ sample position. FIG. 3 depicts several fractional positions in the horizontal (x−) dimension. The solid-square blocks represent integer positions. The circles represent $1/16$-position. For example, MV=(4, 10) means the x component is at $4/16$ position, the y component is at $10/16$ position.

In video coding, a MV rounding process is sometimes used to convert a MV at one position to another target position. One example of rounding is to round a fractional MV position to the nearest integer position.

When a MV is at a fractional position, filtering (typically interpolation) is done to calculate the sample values at those positions. In VVC, the length (number of filter taps) of the interpolation filter for luma component is 8, as shown in Table 1 below.

TABLE 1

| Fractional sample position p | interpolation filter coefficients | | | | | | | |
|---|---|---|---|---|---|---|---|---|
| | $f_L[p][0]$ | $f_L[p][1]$ | $f_L[p][2]$ | $f_L[p][3]$ | $f_L[p][4]$ | $f_L[p][5]$ | $f_L[p][6]$ | $f_L[p][7]$ |
| 1 | 0 | 1 | −3 | 63 | 4 | −2 | 1 | 0 |
| 2 | −1 | 2 | −5 | 62 | 8 | −3 | 1 | 0 |
| 3 | −1 | 3 | −8 | 60 | 13 | −4 | 1 | 0 |
| 4 | −1 | 4 | −10 | 58 | 17 | −5 | 1 | 0 |
| 5 | −1 | 4 | −11 | 52 | 26 | −8 | 3 | −1 |
| 6 | −1 | 3 | −9 | 47 | 31 | −10 | 4 | −1 |
| 7 | −1 | 4 | −11 | 45 | 34 | −10 | 4 | −1 |
| 8 | −1 | 4 | −11 | 40 | 40 | −11 | 4 | −1 |
| 9 | −1 | 4 | −10 | 34 | 45 | −11 | 4 | −1 |
| 10 | −1 | 4 | −10 | 31 | 47 | −9 | 3 | −1 |
| 11 | −1 | 3 | −8 | 26 | 52 | −11 | 4 | −1 |
| 12 | 0 | 1 | −5 | 17 | 58 | −10 | 4 | −1 |
| 13 | 0 | 1 | −4 | 13 | 60 | −8 | 3 | −1 |
| 14 | 0 | 1 | −3 | 8 | 62 | −5 | 2 | −1 |
| 15 | 0 | 1 | −2 | 4 | 63 | −3 | 1 | 0 |

In VVC, the motion vector resolution for a current block is signaled using a block level syntax element. Where the syntax element indicates whether the current block is in 1/16, or ½ or 1 or 4 sample resolution.

Residual, Transform, and Quantization

The difference between samples of a source block (which contains original samples) and samples of the prediction block, is often called ‘residual block’. This residual block is then typically compressed by a spatial transform to remove further redundancy. The transform coefficients are then quantized by a quantization parameter (QP) to control the fidelity of the residual block and thus also the bitrate required to compress the block. A coded block flag (CBF) is used to indicate if there are any non-zero quantized transform coefficients. All coding parameters are then entropy coded at the encoder and decoded at the decoder. A reconstructed block can then be derived by inverse quantization and inverse transformation of the quantized transform coefficients if the coded block flag is one and then add that to the prediction block.

Hierarchical Picture Coding Structure

In random access configuration, intra coded pictures are positioned with a fixed interval (e.g., every second). Pictures between the intra picture are typically coded with a bi-directional group of pictures (B-GOP) structure as shown in FIG. 4. In the example shown in FIG. 4, picture 0 is coded first and then picture 8 is coded using picture 0 as its reference picture. Then, picture 8 and picture 0 are used as reference pictures to code picture 4. Then, similarly, picture 2 and picture 6 are coded. Finally, pictures 1, 3, 5, and 7 are coded.

Pictures 1, 3, 5, and 7 are referred to as being on the highest hierarchical level, pictures 2 and 6 are referred to as being on the next highest hierarchical level, picture 4 is referred to as being on next lowest level, and pictures 0 and 8 are referred to as being on the lowest level. Typically, pictures 1, 3, 5, and 7 are not used as reference pictures for any other pictures. They are called non-reference pictures.

The assigned QP for each picture are usually different and are set according to the hierarchy level. Higher QP is assigned for pictures that at higher hierarchy level.

Inter Prediction/Motion Information

For an inter block in an inter picture in VVC, the inter prediction information of the inter block consists of the following three elements: (1) a reference picture list flag (RefPicListFlag), (2) a reference picture index (RefPicIdx) per reference picture list used, and (3) a motion vector (MV) per reference picture used. A reference picture list flag (RefPicListFlag) signals which reference picture list is used. When the value of RefPicListFlag is equal to 0, L0 is used. When the value of RefPicListFlag is equal to 1, L1 is used. When the value of RefPicListFlag is equal to 2, both L0 and L1 are used. The reference picture index (RefPicIdx) signals which reference picture inside the reference list is to be used. The motion vector (MV) signals the position inside the reference picture that is used for predicting the current block.

The inter prediction information is also referred to as motion information. The decoder stores the motion information for each inter block. In other words, an inter block maintains its own motion information.

Encoder Decision and Rate Distortion (RD) Cost

In practice, for an encoder to decide the best prediction mode for a current block, the encoder will evaluate many or all of the possible prediction modes for the current block and select the prediction mode that yields the smallest Rate-Distortion (RD) cost.

The RD cost is calculated as $D+\lambda*R$. The D (Distortion) measures the difference between the reconstructed block and the corresponding source block. One commonly used metric for calculating D is the sum of squared difference $SSE=\Sigma_{x,y}(P_A(x,y)-P_B(x,y))^2$, where the $P_A$ and $P_B$ are the sample values in the two block A and B respectively. The R (Rate) is usually an estimation of the number of bits to be spent on encoding the mode. The $\lambda$ is a trade-off parameter between R and D.

Motion Information Signaling

VVC includes several methods of implicit signaling motion information for each block, including the merge method and the subblock merge method. A common motivation behind the implicit methods is to inherit motion information from neighboring coded blocks.

Merge (Block Merge) Method

The merge method is similar to the one in the High Efficiency Video Coding (HEVC) standard. The method is sometimes referred to as the block merge method because the derived motion information is used for generating the samples of the entire block.

The method first generates a list of motion information candidates. The list is also referred to as the merge list. The candidates are derived from previously coded blocks. The blocks can be spatially adjacent neighboring blocks or temporal collocated blocks relative to the current block. FIG. 5 shows the spatial neighboring blocks: left (L), top(T), top-right(TR), left-bottom (LB), and top-left (TL).

After the merge list is generated, one of the candidates inside the list is used to derive the motion information of the current block. The candidate selection process is done on the encoder side. An encoder would select a best candidate from the list and encode an index (merge index) in the bitstream to signal to a decoder. The decoder receives the index, follows the same merge list derivation process as the encoder, and uses the index to retrieve the correct candidate.

Explicit Motion Information Signaling

VVC also includes an explicit motion information signaling method, such as alternative motion vector prediction (AMVP). For a current inter block that is coded with AMVP, the number of reference pictures, reference picture indices, and motion vectors for the current inter block are explicitly signaled and encoded into the bitstream.

The explicit motion information signaling is usually chosen by an encoder when directly inheriting or reusing motion information from previously coded inter blocks do not fit well for a current block. For example, when the previously coded blocks and the current block belong to different objects, it is likely that the motion of the previously coded blocks and the current block do not correlate well.

When an encoder decides to use explicit signaling for the current block's MV, the process usually involves deriving of a motion vector predictor (MVP), the MVP is derived from MVs of previously coded blocks. After the MVP is derived, the motion vector difference (MVD) between the MVP and the current MV is calculated as MVD=MV−MVP. FIG. 6 shows an example of the MVD derivation.

As shown in FIG. 6, the MVD also has two components: an x-component and a y-component. Each component has the following information: magnitude and sign. Both the magnitude and sign information (if the magnitude is non-zero) of the x- and y-components are signaled in a bitstream. For example, if the current block's MV is (+10, −5), and the derived MVP is (+7, +3), then the MVD would be (+3, −8), where 3=10−7 and −8=−5−3. The magnitudes 3 and 8, as well as the signs + and −, are all signaled in the bitstream.

For a decoder to reconstruct the MV of the current block, the decoder decodes the magnitude and sign information of both x- and y-component of the MVD from the bitstream. Then, the decoder follows the same predictor derivation process as the encoder to derive the MVP from MVs of previously coded blocks, and the MV is reconstructed by using the MVP and MVD. Using the example above, the decoder decodes the magnitudes 3 and 8 as well as the signs + and − from the bitstream to get the MVD (+3, −8). The decoder then uses the same predictor derivation process to get MVP which is (+7, +3). The decoder then derives the MV as (+10, −5), where 10=3+7, −5=−8+3.

SUMMARY

The existing method for motion vector (MV) explicit signaling requires full information (both the magnitudes and sign information) of a corresponding motion vector difference (MVD) to be signaled in a bitstream. This signaling method may be costly in terms of number of bits.

Aspects of the invention may overcome one or more problems existing method for MV explicit signaling by using a decoder to (1) decode partially encoded MVD information from a coded video bitstream and (2) regenerate the remaining MVD information at the decoder side. Accordingly, the encoder may only encode the partial MVD information to achieve bit-saving of MVD signaling (relative to encoding the complete MVD information).

One aspect of the invention may provide a method for a method for processing (e.g., decoding) a current block within a current picture. The method may include decoding partial motion vector difference (MVD) information of the current block from a coded video bitstream. The method may include determining first and second motion vector predictors (MVPs). The method may include determining complete MVD information using the partial MVD information and one or more of the first and second MVPs. The method may include determining first and second final prediction blocks of the current block using the complete MVD information and the first and second MVPs.

In some aspects, the partial MVD information may include complete or partial magnitude information for first and second MVDs and may not include sign information for one or more of the first and second MVDs, and determining the complete MVD information may include determining sign information for one or more of the first and second MVDs. In some aspects, the partial MVD information may include partial magnitude information for one or more of first and second MVDs, and determining the complete MVD information may include determining complete magnitude information for one or more of the first and second MVDs. In some aspects, the partial magnitude information may include one or more of the most significant bits of a magnitude of one of the first and second MVDs and may not include one or more of the least significant bits of the magnitude of the one of the first and second MVDs.

In some aspects, determining the complete MVD information may include using the partial MVD information to generate a set of MVD hypothesis pairs, and each of the MVD hypothesis pairs may include a possible first MVD and a possible second MVD. In some aspects, the set of MVD hypothesis pairs may include all combinations of possible first MVDs and possible second MVDs. In some aspects, the partial MVD information may include first and second decoded values, the possible first MVDs of the MVD hypothesis pairs may be derived from the first decoded value, and the possible second MVDs of the MVD hypothesis pairs may be derived from the second decoded value.

In some aspects, the first decoded value may indicate a complete magnitude of an x-component of a first MVD, and an x-component of the possible first MVDs of the MVD hypothesis pairs may have the magnitude indicated by the first decoded value with either a positive or a negative sign. In some alternative aspects, the first decoded value may indicate a complete magnitude of a y-component of a first MVD, and a y-component of the possible first MVDs of the MVD hypothesis pairs may have the magnitude indicated by the first decoded value with either a positive or a negative sign. In some other alternative aspects, the partial MVD information may further include a third decoded value, the first decoded value may indicate a complete magnitude of an x-component of a first MVD, the third decoded value may indicate a complete magnitude of a y-component of the first MVD, an x-component of the possible first MVDs of the MVD hypothesis pairs may have the magnitude indicated by the first decoded value with either a positive or a negative sign, and a y-component of the possible first MVDs of the MVD hypothesis pairs may have the magnitude indicated by the third decoded value with either a positive or a negative sign.

In some aspects, the second decoded value may indicate a complete magnitude of an x-component of a second MVD, and an x-component of the possible second MVDs of the MVD hypothesis pairs may have the magnitude indicated by the second decoded value with either a positive or a negative sign. In some alternative aspects, the second decoded value may indicate a complete magnitude of a y-component of a second MVD, and a y-component of the possible second MVDs of the MVD hypothesis pairs may have the magnitude indicated by the second decoded value with either a positive or a negative sign. In some other alternative aspects, the partial MVD information may further include a fourth decoded value, the second decoded value may indicate a complete magnitude of an x-component of a second MVD, the fourth decoded value may indicate a complete magnitude of a y-component of the second MVD, an x-component of the possible second MVDs of the MVD hypothesis pairs may have the magnitude indicated by the second decoded value with either a positive or a negative sign, and a y-component of the possible second MVDs of the MVD hypothesis pairs may have the magnitude indicated by the fourth decoded value with either a positive or a negative sign.

In some aspects, the first decoded value may indicate a partial magnitude indicating possible magnitudes of an x-component of a first MVD, and an x-component of the possible first MVDs of the MVD hypothesis pairs may have a magnitude that is one of the possible magnitudes indicated by the first decoded value with either a positive or a negative sign. In some alternative aspects, the first decoded value may indicate a partial magnitude indicating possible magnitudes of a y-component of a first MVD, and a y-component of the possible first MVDs of the MVD hypothesis pairs may have a magnitude that is one of the possible magnitudes indicated by the first decoded value with either a positive or a negative sign. In some other alternative aspects, the partial MVD information may further include a third decoded value, the first decoded value may indicate a partial magnitude indicating possible magnitudes of an x-component of a first MVD, the third decoded value may indicate a partial magnitude indicating possible magnitudes of a y-component of the first MVD, an x-component of the possible first MVDs of the MVD hypothesis pairs may have a magnitude that is one of the possible magnitudes indicated by the first decoded value with either a positive or a negative sign, and a y-component of the possible first MVDs of the MVD hypothesis pairs may have a magnitude that is one of the possible magnitudes indicated by the third decoded value with either a positive or a negative sign.

In some aspects, the second decoded value may indicate a partial magnitude indicating possible magnitudes of an x-component of a second MVD, and an x-component of the possible second MVDs of the MVD hypothesis pairs may have a magnitude that is one of the possible magnitudes indicated by the second decoded value with either a positive or a negative sign. In some alternative aspects, the second decoded value may indicate a partial magnitude indicating possible magnitudes of a y-component of a second MVD, and a y-component of the possible second MVDs of the MVD hypothesis pairs may have a magnitude that is one of the possible magnitudes indicated by the second decoded value with either a positive or a negative sign. In some other alternative aspects, the partial MVD information may further include a fourth decoded value, the second decoded value may indicate a partial magnitude indicating possible magnitudes of an x-component of a second MVD, the fourth decoded value may indicate a partial magnitude indicating possible magnitudes of a y-component of the second MVD, an x-component of the possible second MVDs of the MVD hypothesis pairs may have a magnitude that is one of the possible magnitudes indicated by the second decoded value with either a positive or a negative sign, and a y-component of the possible second MVDs of the MVD hypothesis pairs may have a magnitude that is one of the possible magnitudes indicated by the fourth decoded value with either a positive or a negative sign.

In some aspects, the method may further include determining that the first decoded value is greater than a threshold. In some aspects, the method may additionally or alternatively include determining that the second decoded value is greater than a threshold.

In some aspects, determining the complete MVD information may further include, for each of the MVD hypothesis pairs: determining a first motion vector (MV) based on the first MVP and the possible first MVD of the MVD hypothesis pair; determining a first prediction block based on the first MV; determining a second MV based on the second MVP and the possible second MVD of the MVD hypothesis pair; determining a second prediction block based on the second MV; and determining a similarity score for the MVD hypothesis pair based on the first and second prediction blocks. In some aspects, the similarity score may be a sum of difference values between samples of the first and second prediction blocks, an absolute sample difference between samples of the first and second prediction blocks, an absolute mean-removed sample difference between samples of the first and second prediction blocks, or a squared sample difference between samples of the first and second prediction blocks. In some aspects, determining the complete MVD information may further include: selecting a similarity metric based on a block size of the current block; and calculating the similarities scores for the MVD hypothesis pairs using the selected similarity metric.

In some aspects, determining the complete MVD information may further include using the similarity scores for the MVD hypothesis pairs to select an MVD hypothesis pair of the set of VD hypothesis pairs that produces the best similarity score, and the complete MVD information may be the selected MVD hypothesis pair. In some aspects, the best similarity score may indicate the smallest differences between the samples of the first and second prediction blocks determined for the MVD hypothesis pair. In some alternative aspects, the best similarity score may indicate the highest similarities between the samples of the first and second prediction blocks determined for the MVD hypothesis pair.

In some aspects, if two or more MVD hypothesis pairs produce the best similarity score, the selected MVD hypothesis pair may be the MVD hypothesis pair of the two or more MVD hypothesis pairs that produces first and second MVs having the highest similarity in terms of signs to the first and second MVPs. In some alternative aspects, the MVD hypothesis pairs of the set of MVD hypothesis pairs may be evaluated in predetermined order, and, if two or more MVD hypothesis pairs produce the best similarity score, the selected MVD hypothesis pair may be the MVD hypothesis pair of the two or more MVD hypothesis pairs that first produced the best similarity score. In some other alternative aspects, the MVD hypothesis pairs of the set of MVD hypothesis pairs may be evaluated in predetermined order, and, if two or more MVD hypothesis pairs produce the best similarity score, the selected MVD hypothesis pair may be the MVD hypothesis pair of the two or more MVD hypothesis pairs that last produced the best similarity score. In some further alternative aspects, determining the complete MVD information may further include determining that only one MVD hypothesis pair of the set of MVD hypothesis pairs that produces the best similarity score.

In some aspects, the possible first MVD of the selected MVD hypothesis pair and the first MVP may be used to determine the first final prediction block, and the possible second MVD of the selected MVD hypothesis pair and the second MVP may be used to determine the second final prediction block. In some aspects, the first and second final prediction blocks may be used for deriving prediction samples of the current block.

In some aspects, determining the first and second final prediction blocks may include using an interpolation filter having longer filter taps than an interpolation filter used to determine the first and second prediction blocks in determining the complete MVD information. In some aspects, determining the first and second prediction blocks based on the first and second MVs, respectively, in determining the complete MVD information may include rounding the first and second MVs and using the rounded first and second MVs to determine the first and second prediction blocks, respectively.

In some aspects, the method may further include decoding a flag (e.g., a block level flag) from the coded video bitstream, the decoded flag may have a value that indicates that the partial MVD information of the current block is present in the coded video bitstream and that the complete MVD information of the current block must be determined.

In some aspects, the method may further include determining that the current block has a motion vector resolution (e.g., a non-fractional resolution) coarser than a certain resolution (e.g., a fractional resolution). In some aspects, the method may further include determining that the current picture has a first reference picture with a picture order count (POC) smaller than the POC of the current picture and a second reference picture with a POC smaller than the POC of the current picture.

Another aspect of the invention may provide a decoder. The decoder may be configured to decode partial motion vector difference (MVD) information of a current block within a current picture from a coded video bitstream. The decoder may be configured to determine first and second motion vector predictors (MVPs). The decoder may be configured to determine complete MVD information using the partial MVD information and one or more of the first and second MVPs. The decoder may be configured to determine first and second final prediction blocks of the current block using the complete MVD information and the first and second MVPs.

Still another aspect of the invention may provide a method for processing (e.g., encoding) a current block within a current picture. The method may include determining first and second motion vector predictors (MVPs). The method may include determining complete motion vector difference (MVD) information of the current block using the first and second MVPs and first and second motion vectors. The complete MVD information may include complete magnitude information for first and second MVDs and sign information for the first and second MVDs, the complete magnitude information may include magnitudes of x- and y-components of the first and second MVDs, and the sign information may include the signs of the x- and y-components of the first and second MVDs. The method may include determining partial MVD information of the current block based on the complete MVD information. The method may include encoding the partial MVD information in a coded video bitstream.

In some aspects, the partial MVD information may include the complete magnitude information or partial magnitude information for first and second MVDs and may not include the sign information. In some aspects, the partial MVD information may include partial magnitude information for one or more of first and second MVDs. In some aspects, the partial magnitude information may include one or more of the most significant bits of a magnitude of one of the first and second MVDs and may not include one or more of the least significant bits of the magnitude of the one of the first and second MVDs.

In some aspects, the method may further include using the partial MVD information to generate a set of MVD hypothesis pairs, and each of the MVD hypothesis pairs may include a possible first MVD and a possible second MVD. In some aspects, the method may further include, for each of the MVD hypothesis pairs: determining a first motion vector (MV) based on the first MVP and the possible first MVD of the MVD hypothesis pair; determining a first prediction block based on the first MV; determining a second MV based on the second MVP and the possible second MVD of the MVD hypothesis pair; determining a second prediction block based on the second MV; and determining a similarity score for the MVD hypothesis pair based on the first and second prediction blocks. In some aspects, the method may further include determining that only one of the MVD hypothesis pairs produces a best similarity score, and the partial MVD information may be encoded if only one of the MVD hypothesis pairs is determined to produce the best similarity score.

In some aspects, the method may further include determining that the current block has a motion vector resolution (e.g., a non-fractional resolution) coarser than a certain resolution (e.g., a fractional resolution), and the partial MVD information may be encoded if the motion vector resolution of the current block is determined to be coarser than the certain resolution. In some aspects, the method may further include determining that the current picture has a first reference picture with a picture order count (POC) smaller than the POC of the current picture and a second reference picture with a POC smaller than the POC of the current picture, and the partial MVD information may be encoded if the current picture has the first and second reference pictures.

In some aspects, the method may further include encoding a flag (e.g., a block level flag) in the coded video bitstream, and the flag may have a value that indicates that the partial MVD information of the current block is present in the coded video bitstream and that a decoder (704) must determine the complete MVD information of the current block.

Yet another aspect of the invention may provide an encoder. The encoder may be configured to determine first and second motion vector predictors (MVPs). The encoder may be configured to determine complete motion vector difference (MVD) information of a current block within a current picture using the first and second MVPs and first and second motion vectors. The complete MVD information may include complete magnitude information for first and second MVDs and sign information for the first and second MVDs, the complete magnitude information may include magnitudes of x- and y-components of the first and second MVDs, and the sign information may include the signs of the x- and y-components of the first and second MVDs. The encoder may be configured to determine partial MVD information of the current block based on the complete MVD information. The encoder may be configured to encode the partial MVD information in a coded video bitstream.

Yet another aspect of the invention may provide a computer program including instructions for adapting an apparatus to perform any of the above methods. Still another aspect of the invention may provide a carrier containing the computer program, and the carrier may be one of an electronic signal, optical signal, radio signal, or compute readable storage medium.

Yet another aspect of the invention may provide an apparatus. The apparatus may include processing circuitry and a memory. The memory may contain instructions executable by said processing circuitry, and the apparatus may be operative to perform any of the above methods.

Still another aspect of the invention may provide an apparatus adapted to perform any of the above methods.

Yet another aspect of the invention may provide any combination of the aspects set forth above.

BRIEF DESCRIPTION OF THE DRAWINGS

The accompanying drawings, which are incorporated herein and form part of the specification, illustrate various embodiments.

DETAILED DESCRIPTION

Figure 1:
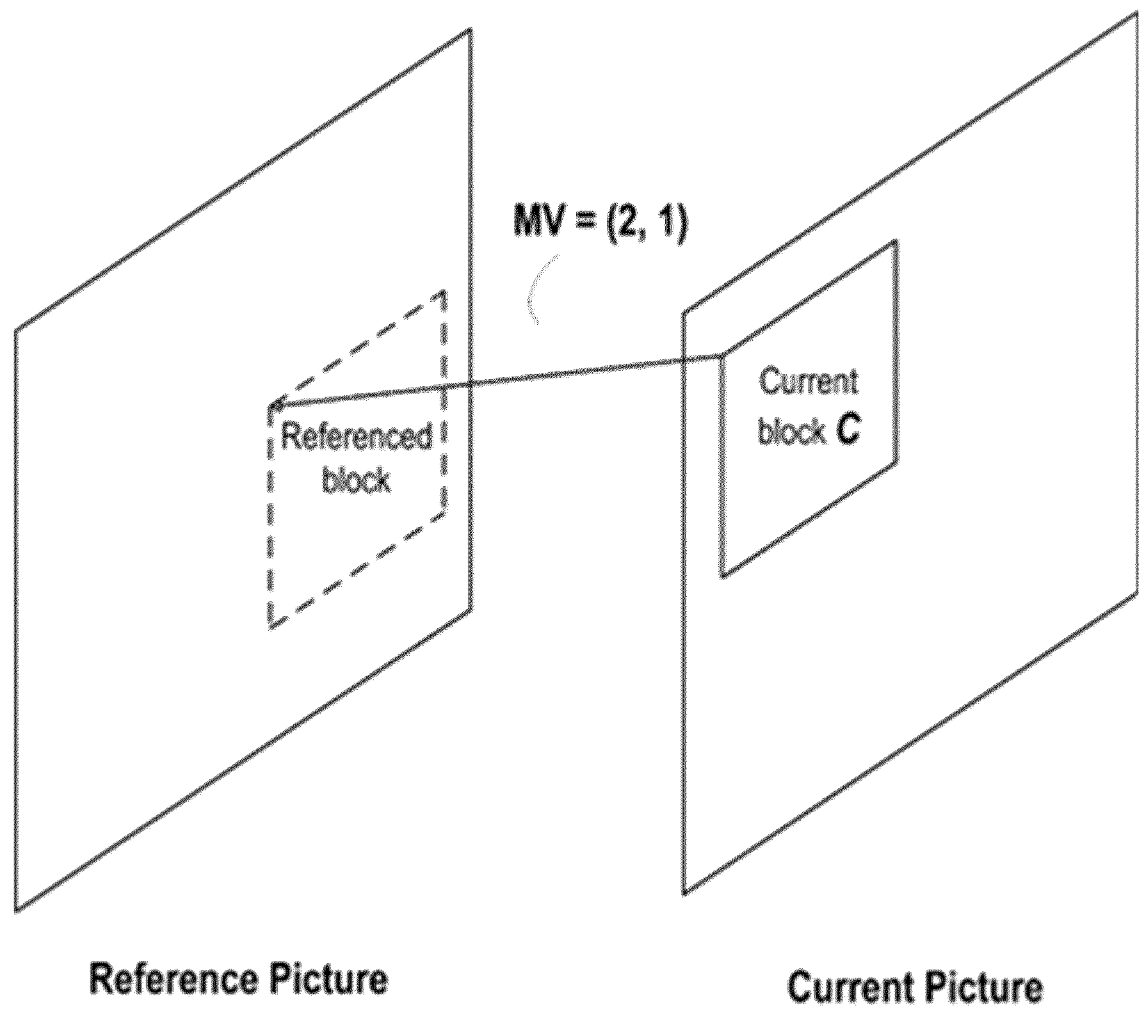
FIG. 1 shows an example of a motion vector (MV) for a current block C.
Figure 2:
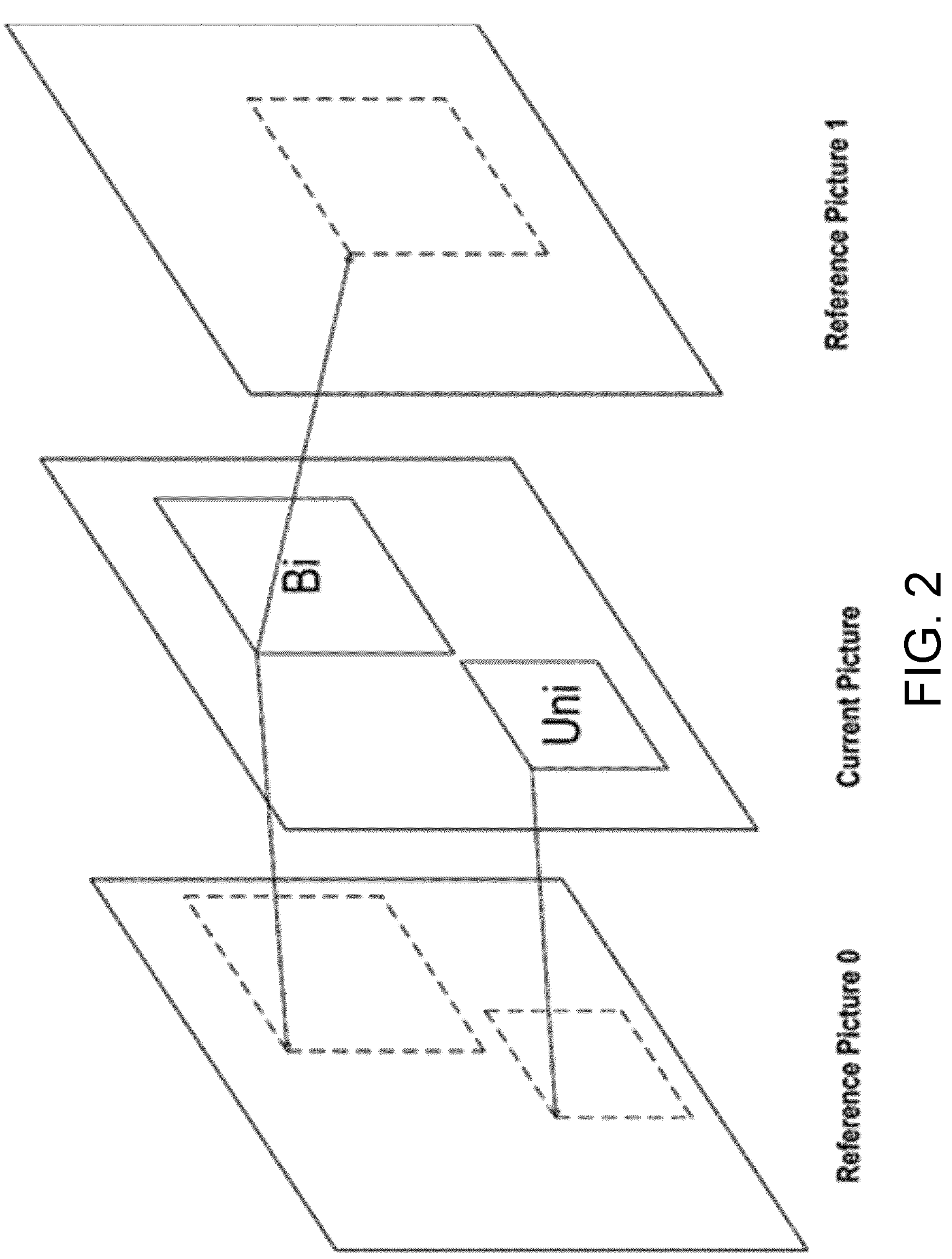
FIG. 2 shows an example of Uni- and Bi-inter prediction.
Figure 3:
FIG. 3 shows motion vector sample positions in the horizontal (x) dimension.
Figure 4:
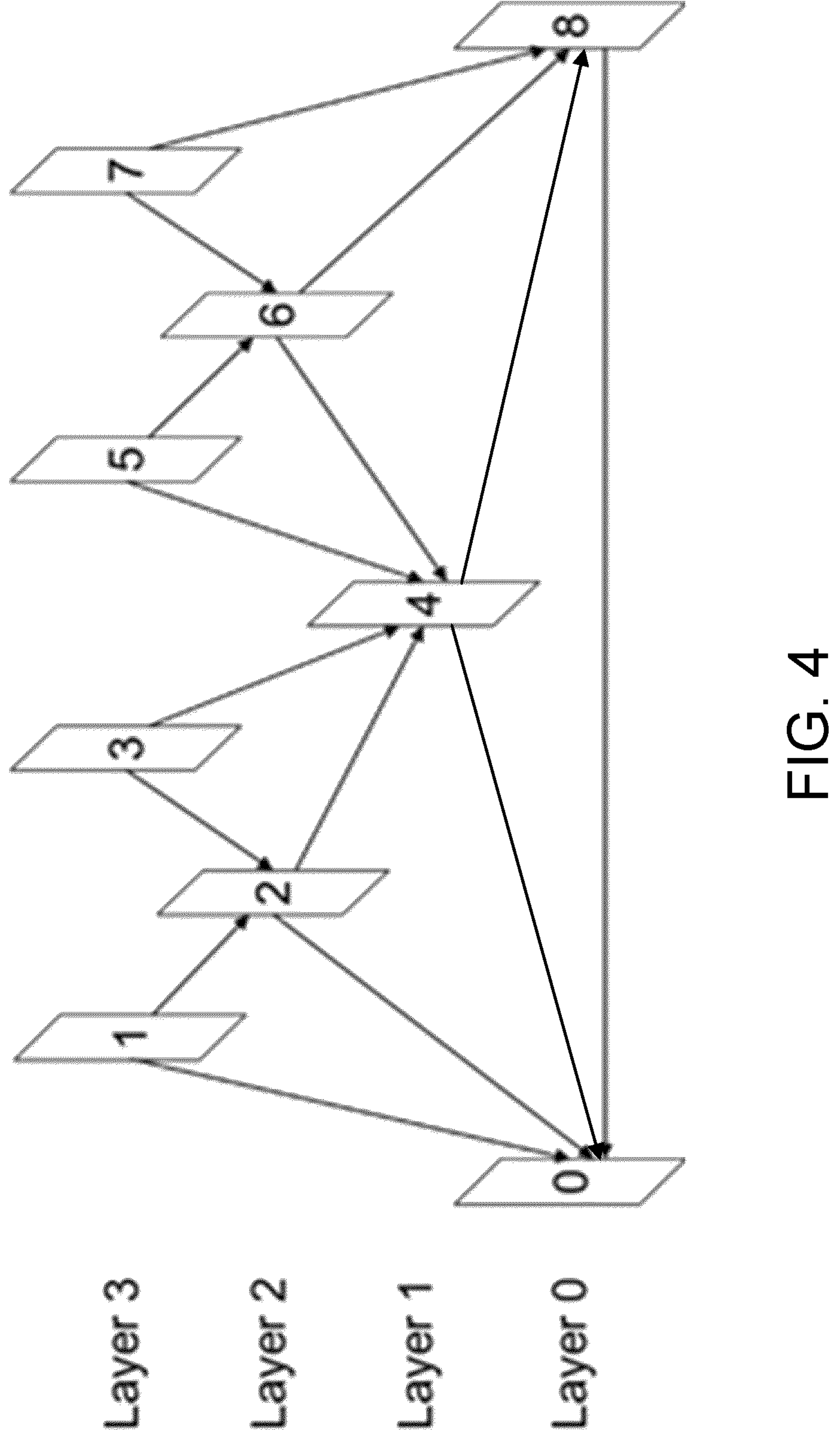
FIG. 4 shows an example of a four-layer bi-directional group of pictures (B-GOP) structure using two reference pictures per picture.
Figure 5:
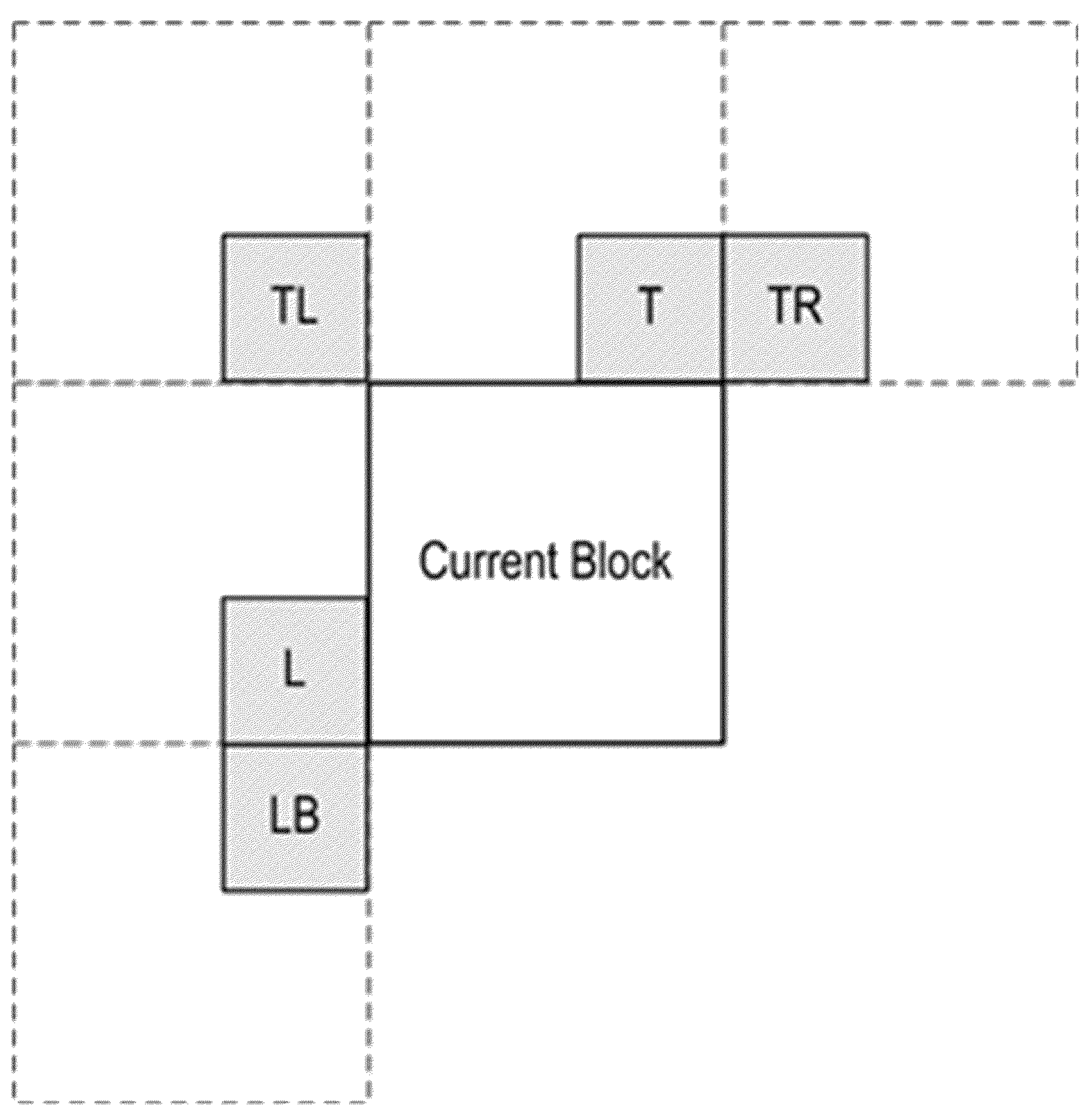
FIG. 5 shows possible spatial blocks for fetching neighboring motion information.
Figure 6:
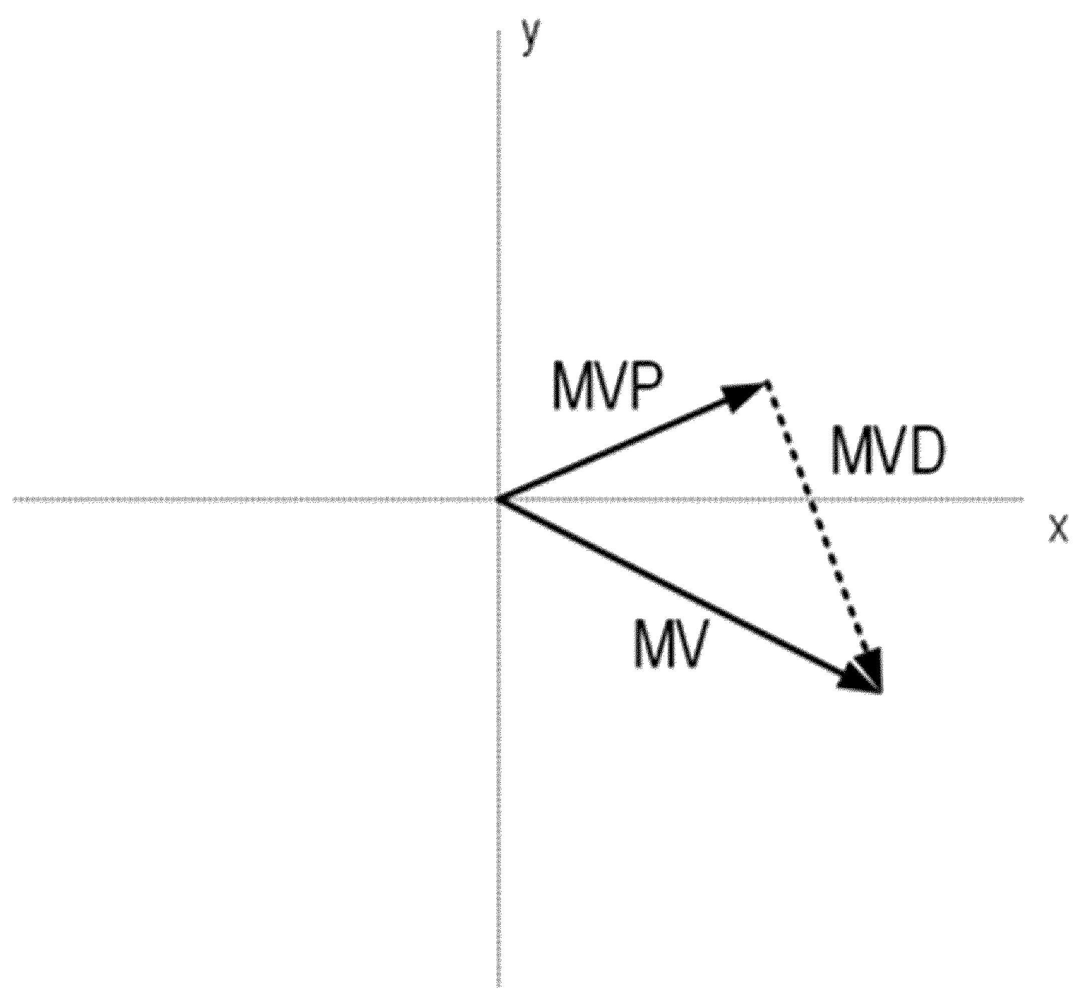
FIG. 6 shows an example of motion vector difference (MVD) derivation.
Figure 7:
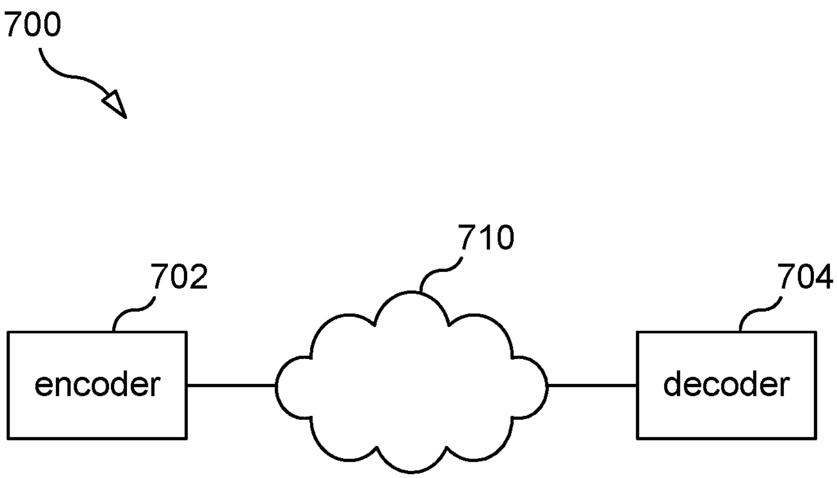
FIG. 7 illustrates a system comprising an encoder and a decoder according to some aspects.

FIG. 7 illustrates a system 700 according to an example embodiment. System 700 includes an encoder 702 and a decoder 704. In the example shown, decoder 704 receives, via a network 710 (e.g., the Internet or other network), encoded images produced by encoder 702.

Figure 8:
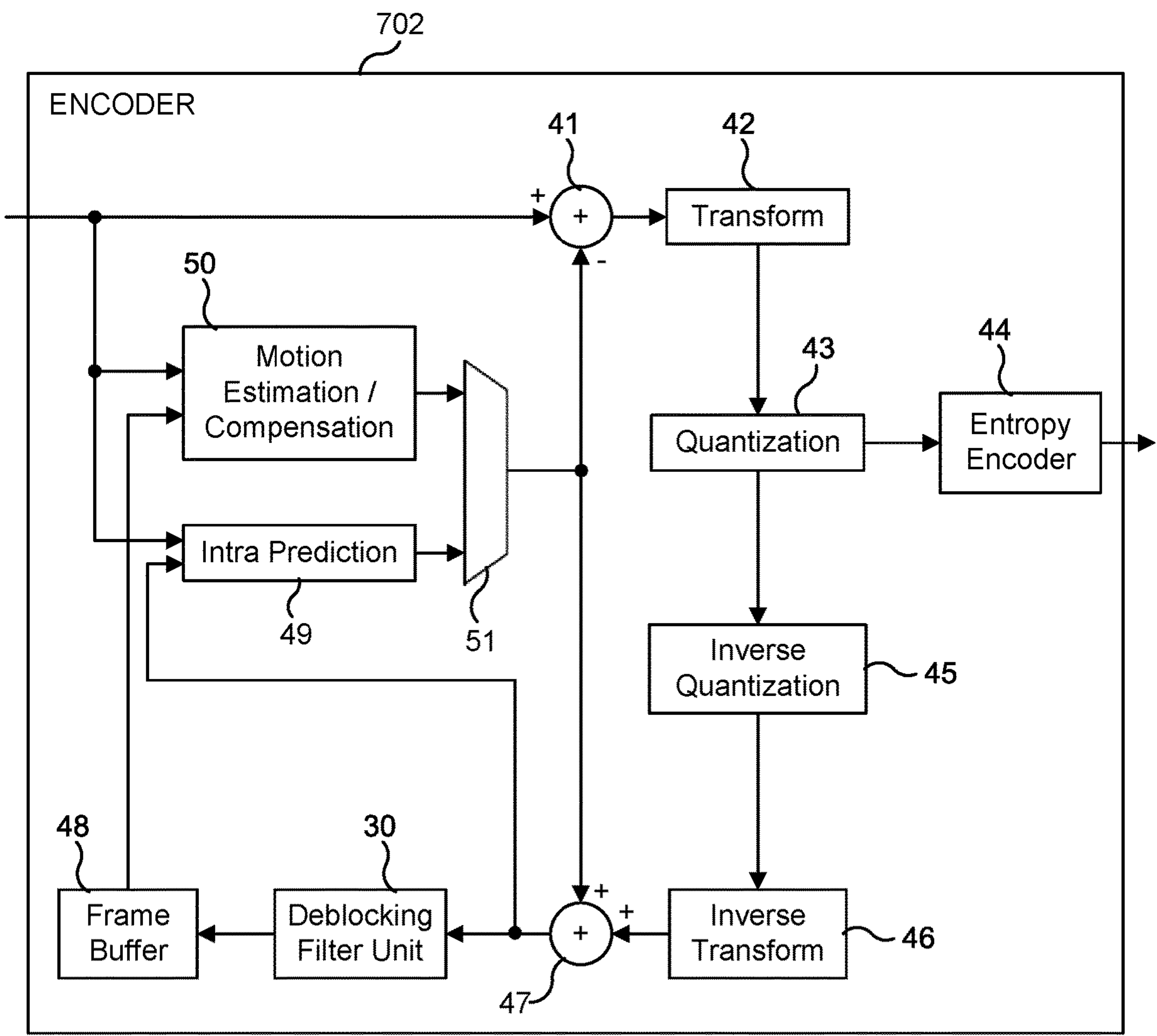
FIG. 8 illustrates an example encoder according to some aspects.

FIG. 8 is a schematic block diagram of the encoder 702 according to some aspects. In some aspects, the encoder 702 may be for encoding a block of pixel values in a video frame (e.g., picture) of a video sequence according to some embodiments. In some aspects, as shown in FIG. 8, the encoder 702 may include a motion estimator 50 that predicts a current block by performing a motion estimation from an already provided block in the same frame or in a previous frame. The result of the motion estimation may be a motion or displacement vector associated with the reference block, in the case of inter prediction. In some aspects, the motion compensator 50 may utilize the motion vector for outputting an inter prediction of the block. In some aspects, the encoder 702 may include an intra predictor 49 that computes an intra prediction of the current block. In some aspects, the encoder 702 may include a selector 51 that receives outputs from the motion estimator/compensator 50 and the intra predictor 49 as inputs and either selects intra prediction or inter prediction for the current block. In some aspects, the output from the selector 51 may be input to an error calculator in the form of an adder 41 that also receives the pixel values of the current block. In some aspects, the adder 41 may calculate and output a residual error as the difference in pixel values between the block and its prediction. In some aspects, the encoder 702 may include a transformer 42 that transforms the error, such as by a discrete cosine transform. In some aspects, the encoder 702 may include a quantizer 43 that quantizes the transformed error. In some aspects, the encoder 702 may include an encoder 44, such as an entropy encoder, that codes the quantized error. In inter coding, the estimated motion vector may also be brought to the encoder 44 for generating the coded representation of the current block. In some aspects, the encoder 702 may include an inverse quantizer 45 and an inverse transformer 46 that receive the transformed and quantized residual error for the current block and retrieve the original residual error. In some aspects, the encoder may include an adder 47 that adds the original residual error to the block prediction output from the motion compensator 50 or the intra predictor 49 to create a reference block that can be used in the prediction and coding of a next block. In some aspects, the encoder 702 may include a deblocking filter unit 30 that processes the new reference block in order to perform deblocking filtering to combat any blocking artifact. In some aspects, the encoder 702 may include a frame buffer 48 that temporarily stores the processed new reference block, and it may be available to the intra predictor 49 and/or the motion estimator/compensator 50.

Figure 9:
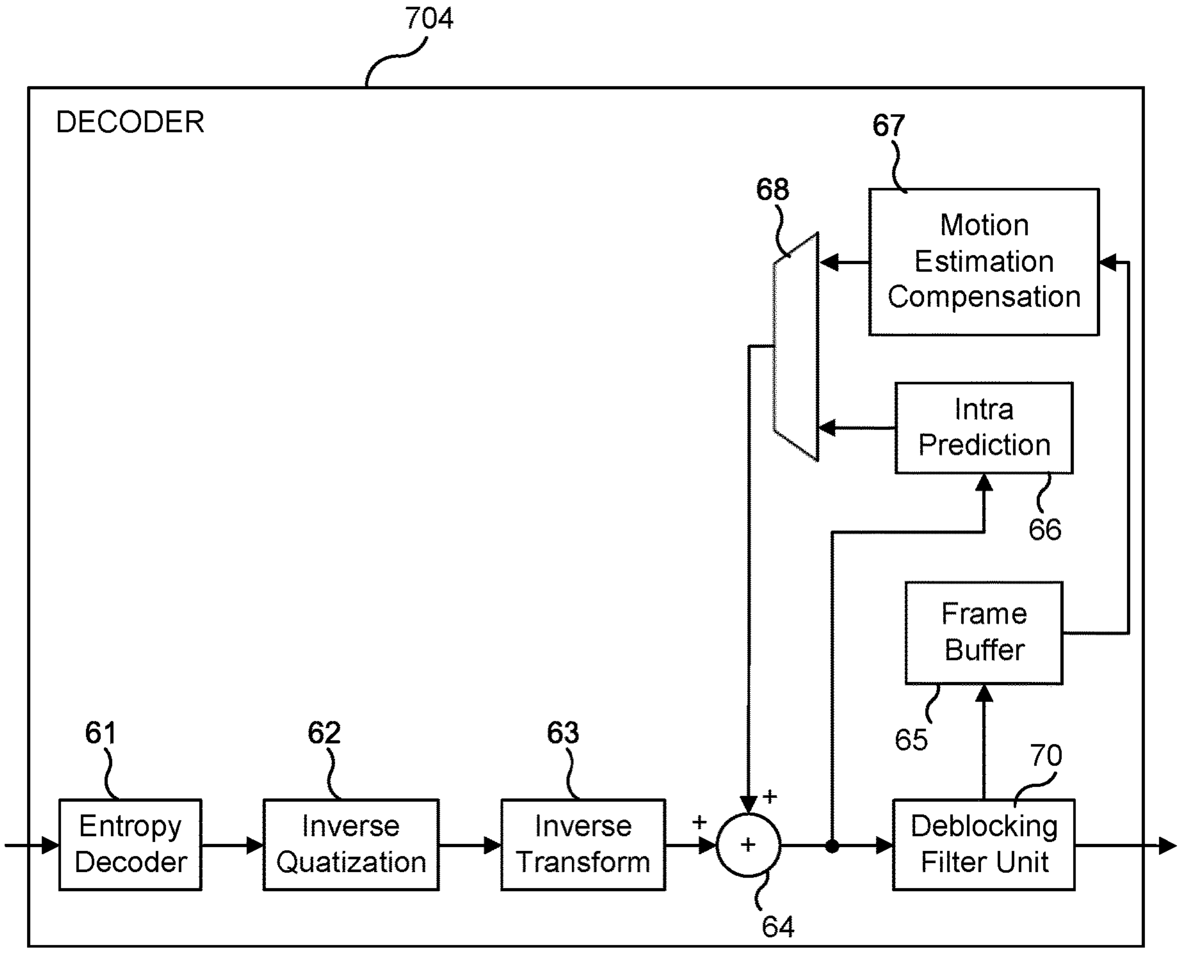
FIG. 9 illustrates an example decoder according to some aspects.

FIG. 9 is a schematic block diagram of the decoder 704 according to some aspects. In some aspects, as shown in FIG. 9, the decoder 704 may include a decoder 61, such as an entropy decoder, for decoding an encoded representation of a block to get a set of quantized and transformed residual errors. In some aspects, the decoder 704 may include an inverse quantizer 62 that dequantizes the residual errors and an inverse transformer 63 and inverse transforms the residual errors to get a set of residual errors. In some aspects, the decoder 704 may include an adder 64 that adds the residual errors to the pixel values of a reference block. In some aspects, the decoder 704 may include a motion estimator/compensator 67 and intra predictor 66 that each determine a reference block, and a selector 48 selects one of the reference blocks depending on whether inter or intra prediction is performed. In some aspects, the selector 68 may be interconnected to the adder 64, the motion estimator/compensator 67, and the intra predictor 66. In some aspects, the resulting decoded block output form the adder QQ464 may be input to a deblocking filter unit 70 in order to deblocking filter any blocking artifacts. In some aspects, the filtered block may be output from the decoder 704 and may be provided to a frame buffer 65 for temporary storage so that the filtered block may be used as a reference block for a subsequent block to be decoded. In some aspects, the frame buffer 65 may be connected to the motion estimator/compensator 67 to make the stored blocks of pixels available to the motion estimator/compensator 67. In some aspects, the output from the adder 64 may preferably be also input to the intra predictor 66 to be used as an unfiltered reference block.

In some aspects, the encoder 702 may partially encode MVD information in a coded video bitstream. In some aspects, the decoder 704 may (i) decode the partially encoded MVD information from the coded video bitstream and (11) regenerate or derive the remaining MVD information. In some aspects, regenerating or deriving the remaining MVD information may include determining a set of MVD hypotheses based on the partially decoded MVD information, selecting one of the hypotheses based on one or more criterions, and using the selected hypothesis for regenerating the remaining MVD information.

Some aspects of the invention may be applied for an inter block coded using bi-predictive motion vectors (MVs). In some aspects, a first motion vector (MV0) and a first motion vector difference (MVD0) may be associated with a first reference picture. In some aspects, a second motion vector (MV1) and a second motion vector difference (MVD1) may be associated with a second reference picture.

In some aspects, the magnitudes of both the x and y components of the MVD0 and/or the MVD1 may be signaled in the coded video bitstream. In some aspects, the sign information of the x and y components of the MVD0 and/or the MVD1 may not signaled be signaled in the coded video bitstream. In some aspects, MVD information may be partially encoded in the coded video bitstream because the coded video bitstream may not include the sign information of the x and y components. For example, in some aspects, if the x component of the MVD0 (MVD0_x) is −4, the y component of the MVD0 (MVD0_y) is +2, the x component of the MVD1 (MVD1_x) is +1, and the y component of the MVD1 (MVD1_y) is +3, only the magnitudes 4, 2, 1, 3 may be signaled in the bitstream, while the sign information (−, +, +, +) is not signaled.

Figure 10:
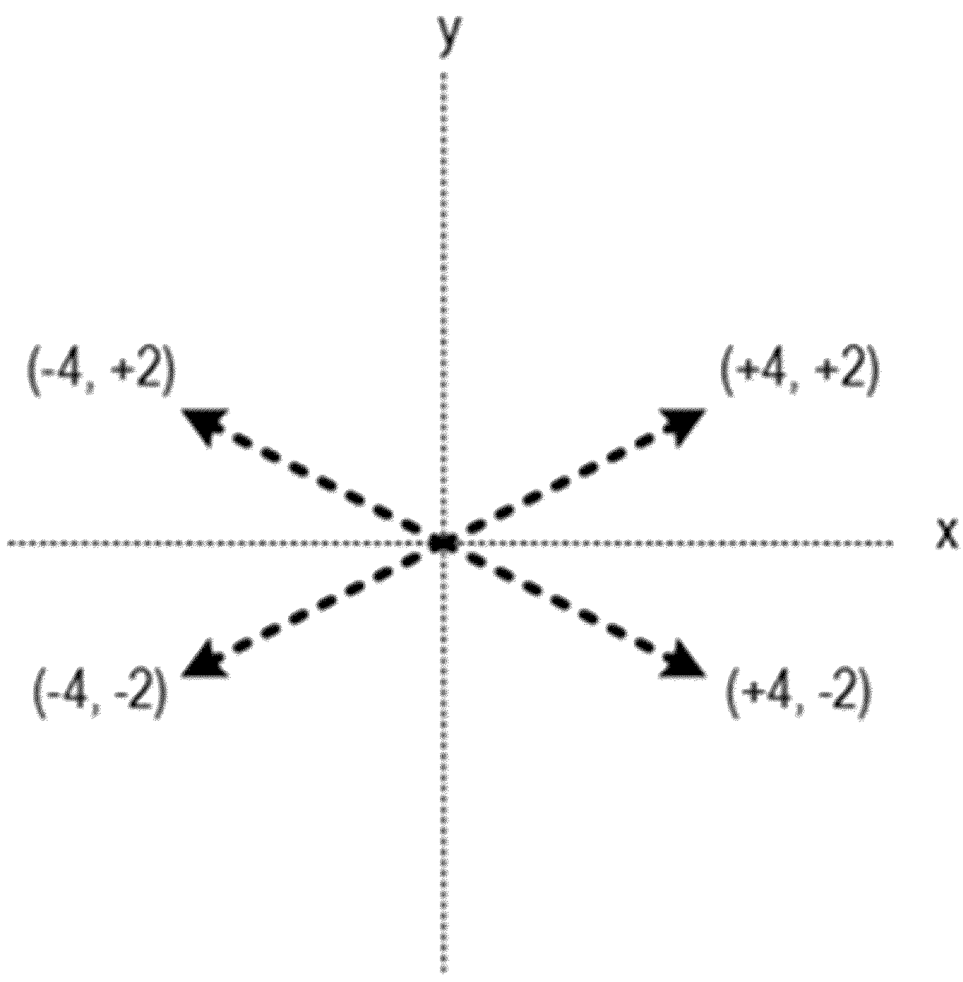
FIG. 10 illustrates an example of possible values of MVD0 according to some aspects.

In some aspects, the decoder 704 may receive the coded video bitstream and decode the magnitude information of both the x and y components of the motion vector difference. In some aspects, the decoder 704 may then figure out how many possible motion vector differences there are. In the example above, there would be four possible motion vector differences for MVD0 (i.e., (+4, +2), (+4, −2), (−4, +2) and (−4, −2)) as shown in FIG. 10. One of the possible MVDs corresponds to the true motion vector difference, which may be (−4, +2) in the example. Similarly, in the example above, there would also be four possible motion vector differences for MVD1 (i.e., (+1, +3), (+1, −3), (−1, +3) and (−1, −3)).

Figure 11:
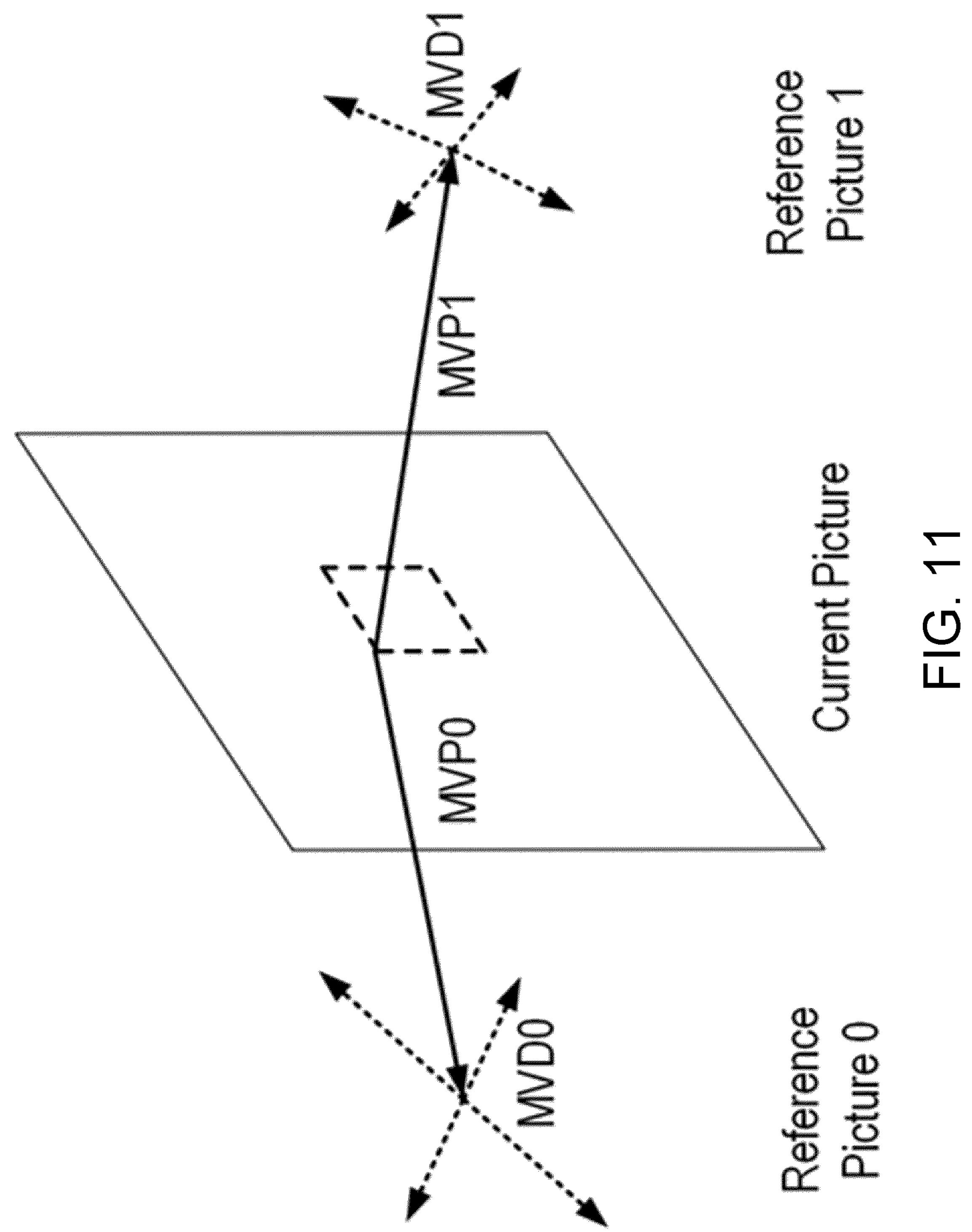
FIG. 11 illustrates an example of possible MVD0 and MVD1 according to some aspects.

FIG. 11 illustrates all the possible motion vector differences of MVD0 and MVD1 according to some aspects. In some aspects, in total, there would be 4*4=16 possible motion vector difference pairs of MVD0 and MVD1. In some aspects, (MVD0_hypo0, MVD1_hypo0) denotes one of the possible pairs of motion vector differences of MVD0 and MVD1.

Figure 12:
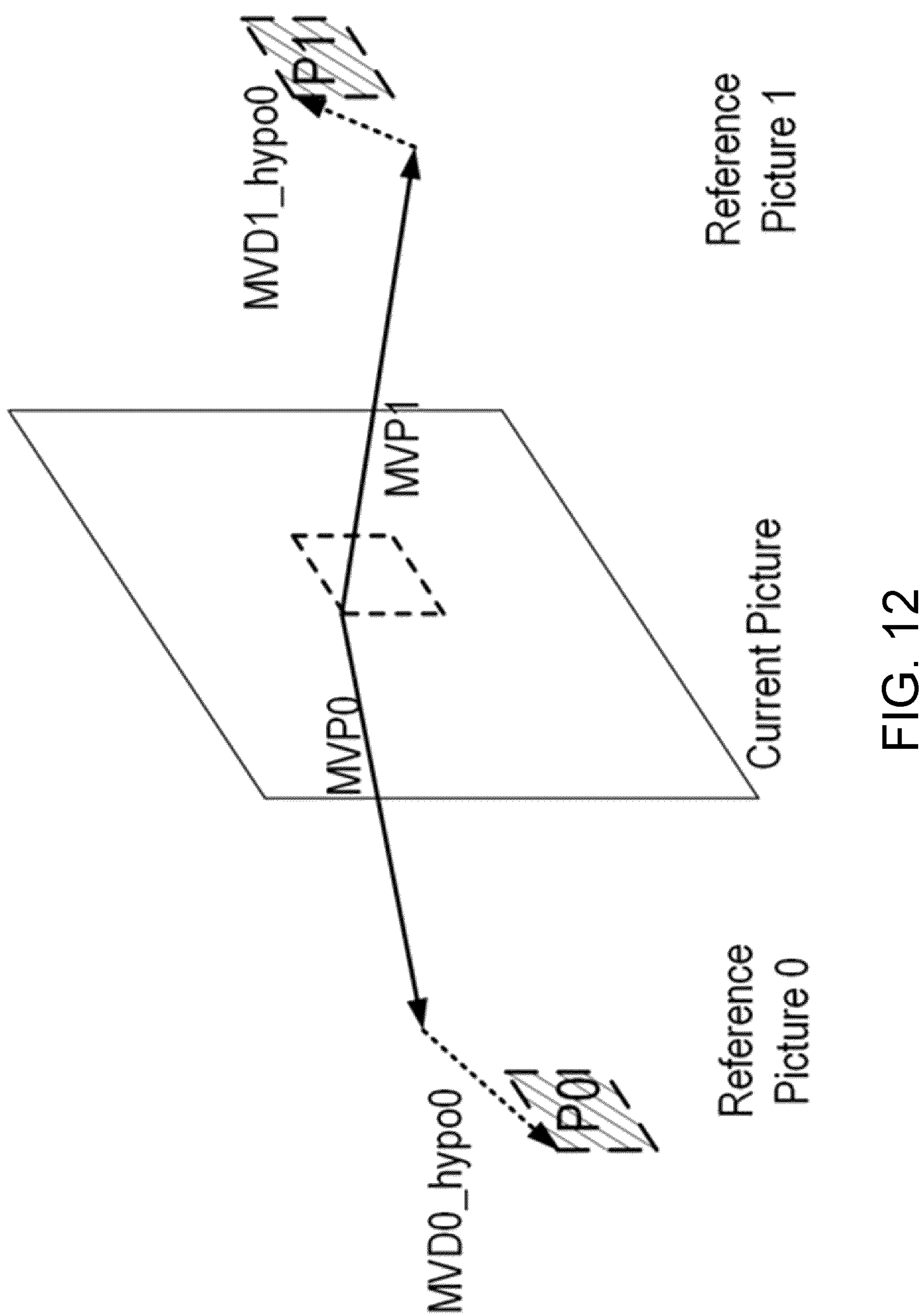
FIG. 12 illustrates an example of prediction block generation based on an MVD pair according to some aspects.

As shown in FIG. 12, in some aspects, the decoder 704 may use the MVD0_hypo0 and MVP0 to generate a first prediction block P0 and may use MVD1_hypo0 and MVP1 to generate a second prediction block P1. In some aspects, after P0 and P1 is generated, the decoder 704 may use a similarity metric to compare the two prediction blocks and generate a similarity score. In some aspects, the similarity metric may be, for example and without limitation, the sum of absolute difference (SAD).

In some aspects, the decoder 704 may determine a similarity score for each of the possible motion vector difference pairs. In some aspects, the decoder 704 may select the possible motion vector difference pair (MVD0 hypoBest, MVD1 hypoBest) that has the highest similarity score between its corresponding prediction blocks (P0 and P1). In other words, in some aspects, the decoder 704 may select the pair of possible motion vector differences that gives the smallest difference between P0 and P1. In some aspects, the MVD0_hypoBest and MVD1 hypoBest may be determined to be the final MVD0 and MVD1, and the decoder 704 may use the final MVD0 and MVD1 for generating the final prediction samples of the current block. Thus, in some aspects, the decoder 704 may pick the MVD hypothesis pair where P0 and P1 are as similar to each other as possible. This works in practice because the prediction blocks P0 and P1 are both used for predicting the current block, which means that both P0 and P1 are similar to the current block and, hence, similar to each other.

In some aspects, the encoder 702 may signal the usage of the partially encoded MVD information using a block level flag. In some aspects, when the block level flag has a first value (e.g., a value of 1), then deriving the remaining MVD information is enabled. In some aspects, when the block level flag has a second value (e.g., a value of 0), then deriving the remaining MVD information is disabled, and the MVD information is fully encoded in and decoded from the bitstream. In some aspects, the partially encoded MVD information and deriving the remaining MVD information may be disabled, for example, for blocks where the MVD hypothesis pair that produces the most similar prediction blocks P0 and P1 is not the correct MVD hypothesis pair. This can happen, for instance, when two or more MVD hypothesis pairs get the same similarity score. In some aspects, the decoder 704 may select one of the MVD hypothesis pairs (e.g., the first or the last MVD hypothesis pair that produces the similarity score) when another of the MVD hypothesis pairs may be the better choice. This can also happen, for instance, when the selected MVD hypothesis pair produces a similarity score that is only slightly higher than the lowest such score.

In some aspects, using partially encoded MVD information and having the decoder 704 derive the remaining MVD information may provide the advantage of the reduced signaling cost of MVD information. For example, the numbers in the tables below show the relative bit-cost of using partially encoded MVD information and having the decoder 704 derive the remaining MVD information to achieve equivalent objective video quality (measured in peak signal-to-noise-ratio (PSNR)) as ECM-2.0, which is an exploration codec model with its compression capabilities beyond Versatile Video Coding (VVC), under different test configurations. In the ECM-2.0, complete MVD information including magnitudes and signs are fully encoded in a coded video bitstream. In the tables below, the Bjontegaard rate difference (BD-rate) number −0.X % means the solution using partially encoded MVD information and having the decoder 704 derive the remaining MVD information requires 0.X % less bits than ECM-2.0 under the respective test configuration.

TABLE 2

BD-rate performance of the proposed method over ECM-2.0 under common test configuration (CTC)

| | Y | U | V |
|---|---|---|---|
| Class A1 | −0.07% | −0.02% | −0.11% |
| Class A2 | −0.06% | −0.12% | −0.06% |
| Class B | −0.04% | −0.07% | −0.07% |
| Class C | −0.05% | −0.06% | −0.02% |
| Class E | | | |
| Overall | −0.05% | −0.07% | −0.06% |
| Class D | −0.04% | −0.03% | −0.19% |

TABLE 3

BD-rate performance of the proposed method over ECM-2.0 under non-CTC configuration (with decoder side motion derivation tool DMVD turned off in both anchor and test)

| | Y | U | V |
|---|---|---|---|
| Class A1 | −0.20% | −0.19% | −0.17% |
| Class A2 | −0.19% | −0.10% | −0.18% |
| Class B | −0.14% | −0.19% | −0.24% |
| Class C | −0.15% | −0.18% | −0.10% |
| Class E | | | |
| Overall | −0.16% | −0.17% | −0.18% |
| Class D | −0.18% | −0.08% | −0.12% |
| Class F | −0.08% | −0.09% | −0.07% |

TABLE 4

BD-rate performance of the proposed method over ECM-2.0 under non-CTC configuration (with template matching tool turned off in both anchor and test)

| | Y | U | V |
|---|---|---|---|
| Class A1 | | | |
| Class A2 | | | |
| Class B | | | |
| Class C | −0.12% | −0.15% | −0.22% |
| Class E | | | |
| Overall | | | |
| Class D | −0.13% | −0.09% | −0.11% |

Figure 13:
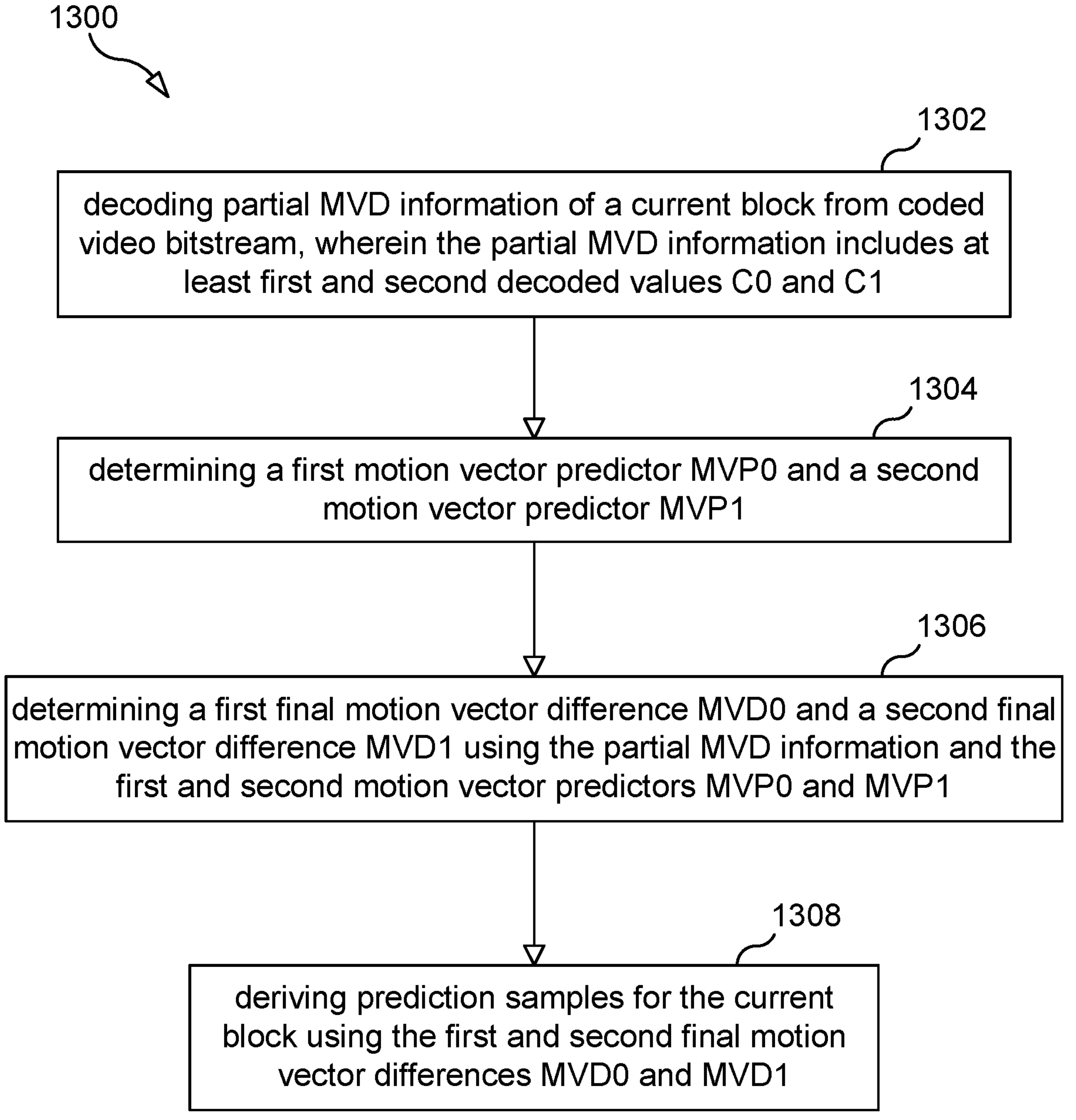
FIG. 13 is a flow chart illustrating a process according to some aspects.

FIG. 13 illustrates a process 1300 according to some aspects. In some aspects, the process 1300 may be for decoding a current block within a current picture inside a coded video bitstream. In some aspects, some or all of the steps of the process 1300 may be performed by a decoder 704.

In some aspects, the process 1300 may be performed only when a current picture (with picture order count (POC) =pocC) has one reference picture with POC value smaller than pocC and the other reference picture with POC value greater than pocC. That is, in some aspects, the process 1300 may be performed only when one reference picture is outputted or displayed before the current picture, and the other reference picture is outputted or displayed after the current picture. In some aspects, the process 1300 may be additionally or alternatively be performed only when the current block has a motion vector resolution coarser than a resolution threshold (e.g., when the current block has a motion vector resolution that is non-fractional). In some aspects, the process 1300 may be additionally or alternatively be performed only when the bitstream (e.g., a block level flag) signals usage of the partially encoded MVD information. In some aspects, when the block level flag has a first value (e.g., a value of 1), then the process 1300 may be performed for the current block.

In some aspects, as shown in FIG. 13, the process 1300 may include a step 1302 in which the decoder 704 decodes partial motion vector difference (MVD) information of a current block from the coded video bitstream. In some aspects, the decoded partial MVD information may include a first decoded value C0 and a second decoded value C1. In some aspects, as shown in FIG. 13, the process 1300 may include a step 1304 in which the decoder 704 determines a first motion vector predictor MVP0 and a second motion vector predictor MVP1.

Figure 14:
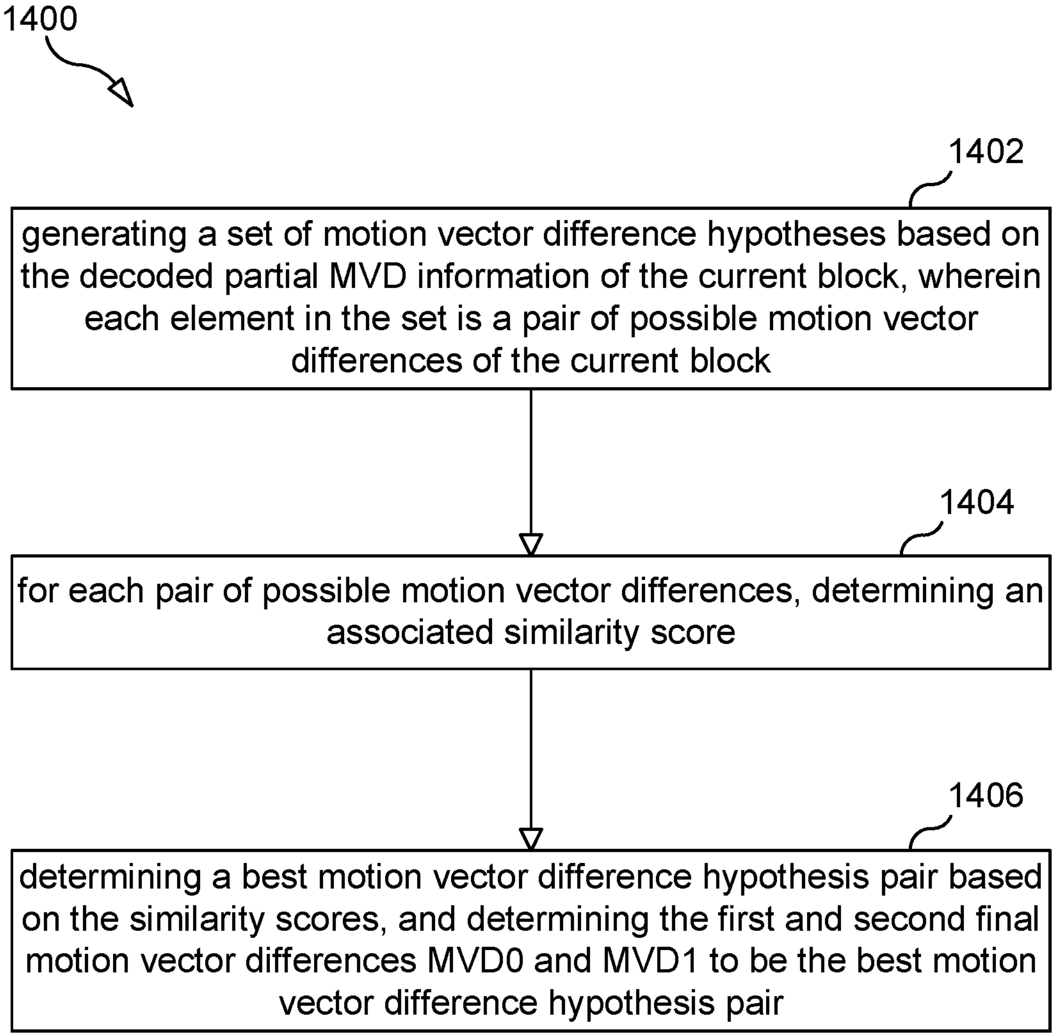
FIG. 14 is a flow chart illustrating a process according to some aspects.

In some aspects, as shown in FIG. 13, the process 1300 may include a step 1306 in which the decoder 704 determines a first final motion vector difference MVD0 and a second final motion vector difference MVD1 using the partial MVD information and the first and second motion vector predictors MVP0 and MVP1. In some aspects, the values C0 and C1 decoded in step 1302 may be all or part of partial information of the first and second final motion vector differences MVD0 and MVD1. FIG. 14 illustrates a process 1400 for determining the first final motion vector difference MVD0 and the second final motion vector difference MVD1 according to some aspects. In some aspects, the process 1400 may be performed in step 1306 of the process 1300. In some aspects, some or all of the steps of the process 1400 may be performed by a decoder 704.

In some aspects, as shown in FIG. 14, the process 1400 may include a step 1402 in which the decoder 704 generates a set of motion vector difference hypotheses where each element (with index i) in the set is a pair of motion vector differences {mvdHypo0_i, mvdHypo1_i}, mvdHypo0_i is derived based on the first decoded value C0, and mvdHypo1_i is derived based on the second decoded value C1. In some aspects, the set of motion vector difference hypotheses may include all combinations of possible values of MVD0 and MVD1.

In some aspects, as shown in FIG. 14, the process 1400 may include a step 1404 in which the decoder 704, for each pair (with index i) {mvdHypo0_i, mvdHypo1_i}, determines an associated similarity score. In some aspects, determining the associated similarity score in step 1404 may include (i) deriving a first prediction block P0 using the first motion vector mv0_i, where the first motion vector mv0_i is derived based on MVP0 and mvdHypo0_i, (ii) deriving a second prediction block P1 using the second motion vector mv1_i, where the second motion vector mv1_i is derived based on MVP1 and mvdHypo1_i, and (iii) determining a similarity score based on the first prediction block P0 and the second prediction block P1 using a similarity metric.

In some aspects, deriving the first and second prediction blocks P0 and P1 in step 1404 may include performing an MV rounding operation for the first motion vector mv0_i and/or the second motion vector mv1_i. That is, in some aspects, a rounded version of the motion vectors mv0_i and/or mv1_i may be used for generating the prediction block P0 or P1 (instead of using unrounded versions of the motion vectors mv0_i and/or mv1_i). For example, in some aspects, the decoder 704 may round the mv0_i or mv_i to integer motion vector resolution. In some of these aspects, no interpolation may be needed, which may make the computation cheaper. As an alternative, in some of these aspects, the decoder 704 may use a 1 tap interpolation filter when deriving the prediction block P0 and/or P1 in step 1404.

In some aspects, the similarity score in step 1404 may be a sum of difference values between the samples of the prediction block P0, P1 (e.g., score=Σ diff(i, j)). In some aspects, diff(i, j) may be the difference value at sample position (i, j). In some alternative aspects, diff(i, j) may be an absolute sample difference (e.g., diff(i, j)=|P0(i, j)−P1(i, j)|). In some other alternative aspects, diff(i, j) may be the absolute mean-removed sample difference (e.g., diff(i, j)=|P0(i, j)−P1(i, j)−E|, where E is the average of all the sample differences). In some aspects, E may be calculated, for example and without limitation, $$E = 1/MxN * \left(\sum_{i=0}^{M-1} \sum_{j=0}^{N-1} (P0(i, j) - P1(i, j))\right)$$

where M is the width of the current block, and N is the height of the current block. In some aspects, using the absolute mean-removed sample difference may put more emphasizes on the differences in higher-frequencies. In some other alternative aspects, diff(i, j) may be the squared sample difference (e.g., diff(i, j)=(P0(i, j)−P1(i, j))$^2$). In some other alternative aspects, for blocks with a size (e.g., width×height) smaller than a threshold (e.g., 128), a first similarity metric (e.g., sum of absolute difference (SAD)) may be used, and, for blocks with size not smaller than the threshold, a second similarity metric (e.g., absolute mean-removed sample difference) may be used.

In some aspects, as shown in FIG. 14, the process 1400 may include a step 1406 in which the decoder 704 determines a best motion vector difference hypothesis pair {mvdHypo0_best, mvdHypo1_best} based on the similarity scores determined in step 1404. In some aspects, the first final motion vector difference MVD0 may be determined to be mvdHypo0_best, and the second final motion vector difference MVD1 may be determined to be mvdHypo1_best.

In some aspects, the similarity metric may measure differences in terms of sample values between the P0 and P1 blocks, and the best motion vector difference hypothesis pair may be determined in step 1406 to be the pair with the smallest differences. In some alternative aspects, the similarity metric may measure similarities in terms of sample values between the P0 and P1 blocks, and the best motion vector difference hypothesis pair may be determined in step 1406 to be the pair with the highest similarities.

In some aspects, when two or more MVD hypothesis pairs give the same highest similarity score, the decoder 704 may give priority to the MVD hypothesis pair that results in a pair of MVs having the highest similarity in terms of signs compared to the corresponding predictors. For example, in some aspects, if a first MVD hypothesis pair having a value {(−4, 0), (0, 0)} and a second MVD hypothesis pair having a value {(+4, 0), (0, 0)} have the same highest similarity score, the corresponding predictor MVP0 is (+2, 0), and the corresponding predictor MVP1 is (+1, +1), the first MVD hypothesis pair would result in a pair of MVs {(−2, 0), (+1, +1)}, and the second MVD hypothesis pair would result in a pair of MVs {(+6, 0), (+1, +1)}. In some aspects, the decoder 704 may give priority to the second MVD hypothesis pair {(+4, 0), (0, 0)} for selection because it resulted an MV pair {(+6, 0), (+1, +1)} having more similar signs when compared to the MVPs. In some aspects, the MVD hypothesis pair that produces an MV pair having the most similar signs to the MVPs may be selected because the MVPs are likely to indicate the true motion direction, and the direction is indicated by the signs. In some aspects, the higher similarity in terms of signs may have higher chance that the MVs generated from the MVD hypothesis pair would correspond to the true motion.

In some alternative aspects, the decoder 704 may evaluate the MVD hypothesis pairs in a predetermined order, and, when two or more MVD hypothesis pairs give the same highest similarity score, the decoder 704 may select the first MVD hypothesis pair that results in the highest similarity score. In some other alternative aspects, the decoder 704 may evaluate the MVD hypothesis pairs in a predetermined order, and, when two or more MVD hypothesis pairs give the same highest similarity score, the decoder 704 may select the last MVD hypothesis pair that results in the highest similarity score.

In some other alternative aspects, when two or more MVD hypothesis pairs give the same highest similarity score, the derivation of the remaining MVD information may be automatically de-selected, and the decoder 704 may instead obtain the remaining MVD information (e.g., the sign information) from the bitstream. In some of these aspects, the encoder 702 may determine whether two or more MVD hypothesis pairs will give the same highest similarity score. If only one MVD hypothesis pair will give the highest similarity score, the encoder 702 may encode partial MVD information (e.g., only MVD magnitudes and not MVD signs) in the bitstream. If two or more MVD hypothesis pairs will give the same highest similarity score, the encoder 702 may encode complete MVD information in the bitstream. In some of these aspects, the decoder 704 will similarly determine whether two or more MVD hypothesis pairs give the same highest similarity score. If only one MVD hypothesis pair gives the highest similarity score, the decoder 704 may select the MVD hypothesis pair as the best/final MVD hypothesis pair. If two or more MVD hypothesis pairs give the highest similarity score, the decoder 704 may decode the remaining MVD information (e.g., the MVD sign bits) from the bitstream. In some of these aspects, a bit (e.g., a block level flag) in the bitstream signals whether partially encoded MVD information of a current block is present in the bitstream and whether the decoder 704 must derive the remaining MVD information of the current block.

In some aspects, as shown in FIG. 13, the process 1300 may include a step 1308 in which the decoder 704 derives prediction samples for the current block using the selected first motion vector difference MVD0 and the selected second motion vector difference MVD1. In some aspects, deriving prediction samples for the current block may include deriving a first final prediction block P0_final using the selected MVD0 and deriving a second final prediction block P1_final using the selected MVD1.

In some aspects, the same interpolation filter may be used to derive the prediction blocks P0 and P1 using the MVD hypothesis pairs (e.g., in step 1304 of the process 1300 and/or in step 1404 of the process 1400) and to derive the final prediction blocks P0_final and P1_final using the selected/final MVD pair (e.g., in step 1306). In some alternative aspects, a first interpolation filter may be used to derive the prediction blocks P0 and P1 using the MVD hypothesis pairs (e.g., in step 1304 of the process 1300 and/or in step 1404 of the process 1400), and a second interpolation filter may be used to derive the final prediction blocks P0_final and P1_final using the selected/final MVD pair (e.g., in step 1306). In some aspects, the first interpolation filter used in the derivation of P0 and P1 may have shorter filter taps than the second interpolation filter used in the derivation of P0_final and P1_final. For example, in some aspects, the first interpolation filter used in the derivation of P0 and P1 may have a filter tap of 4, while the second interpolation filter used in the derivation of P0_final and P1_final may have a filter tap of 12.

In short, the decoder 704 may retrieve partial information of MVD0 or MVD1 from the decoded value C0 or C1 (e.g., in step 1302 of the process 1300) and then invokes a process (e.g., in step 1306 of the process 1300 and/or the process 1400 shown in FIG. 14) to derive the remaining information of MVD0 or MVD1.

In some aspects (e.g., some complete magnitude aspects), the first value C0 (e.g., decoded in step 1302 of the process 1300) may indicate the complete magnitude of the MVD0's x-component. That is, in some aspects, the magnitude information of the x-component of the final motion vector difference MVD0 may be fully decoded from the bitstream, and the decoder 704 may regenerate the sign information of the x-component of the final motion vector difference MVD0 (e.g., in step 1306 and/or in step 1406). For example, in some aspects, if the decoded value C0 equals 4 and the value of MVD0's y-component is 0, the possible values of MVD0 are then (−4, 0) and (+4, 0). If MVD1 is assumed to be (+2, +2), then the set of motion vector difference hypotheses pairs determined in step 1402 is {{(−4, 0), (+2, +2)}, {(+4, 0), (+2, +2)}}. In some aspects, the set may contain all the possible combinations of the possible values of MVD0 and MVD1.

In some alternative aspects (e.g., some alternative complete magnitude aspects), the first value C0 (e.g., decoded in step 1302 of the process 1300) may indicate the complete magnitude of the MVD0's y-component. That is, in some aspects, the magnitude information of the y-component of the final motion vector difference MVD0 may be fully decoded from the bitstream, and the decoder 704 may regenerate the sign information of the y-component of the final motion vector difference MVD0 (e.g., in step 1306 and/or in step 1406).

In some other alternative aspects (e.g., some other alternative complete magnitude aspects), in step 1302, the decoder 704 may decode the first coded value C0 and may additionally decode a third coded value C2. In some aspects, the first value C0 may indicate the complete magnitude of the MVD0's x-component, and the third value C2 may indicate the complete magnitude of the MVD0's y-component. That is, in some aspects, the magnitude information of the x-component of the final motion vector difference MVD0 may be fully decoded from the bitstream, the magnitude information of the y-component of the final motion vector difference MVD0 may be fully decoded from the bitstream, and the decoder 704 may regenerate the sign information of the x- and y-components of the final motion vector difference MVD0 (e.g., in step 1306 and/or in step 1406).

In some aspects (e.g., some complete magnitude aspects), the second value C1 (e.g., decoded in step 1302 of the process 1300) may indicate the complete magnitude of the MVD1's x-component. That is, in some aspects, the magnitude information of the x-component of the final motion vector difference MVD1 may be fully decoded from the bitstream, and the decoder 704 may regenerate the sign information of the x-component of the final motion vector difference MVD1 (e.g., in step 1306 and/or in step 1406). For example, in some aspects, if the decoded value C1 equals 4 and assuming the value of MVD1's y-component to be 0, the possible values of MVD1 are then (−4, 0) and (+4, 0). If MVD0 is assumed to be (+2, +2), then the set of motion vector difference hypotheses pairs determined in step 1402 is {{(+2, +2), (−4, 0)}, {(+2, +2), (+4, 0)}}. In some aspects, the set may contain all the possible combinations of the possible values of MVD0 and MVD1.

In some alternative aspects (e.g., some alternative complete magnitude aspects), the second value C1 (e.g., decoded in step 1302 of the process 1300) may indicate the complete magnitude of the MVD1's y-component. That is, in some aspects, the magnitude information of the y-component of the final motion vector difference MVD1 may be fully decoded from the bitstream, and the decoder 704 may regenerate the sign information of the y-component of the final motion vector difference MVD1 (e.g., in step 1306 and/or in step 1406).

In some other alternative aspects (e.g., some other alternative complete magnitude aspects), in step 1302, the decoder 704 may decode the second coded value C1 and may additionally decode a fourth coded value C3. In some aspects, the second value C1 may indicate the complete magnitude of the MVD1's x-component, and the fourth value C3 may indicate the complete magnitude of the MVD1's y-component. That is, in some aspects, the magnitude information of the x-component of the final motion vector difference MVD1 may be fully decoded from the bitstream, the magnitude information of the y-component of the final motion vector difference MVD1 may be fully decoded from the bitstream, and the decoder 704 may regenerate the sign information of the x- and y-components of the final motion vector difference MVD1 (e.g., in step 1306 and/or in step 1406).

In some aspects (e.g., some partial magnitude aspects), the first value C0 (e.g., decoded in step 1302 of the process 1300) may partially indicate the magnitude of the MVD0's x-component. In some aspects, the decoder 704 may regenerate the remaining magnitude information and the sign information of the x-component of the final motion vector difference MVD0 (e.g., in step 1306 and/or in step 1406). For example, in some aspects, the decoded value C0 may correspond to the most significant bits (MSBs) of the magnitude of MVD0's x-component. For example, if the magnitude of the x-component of the MVD0 has a value of 6 or 7 in decimal (110 or 111 in binary), the encoder 702 may encode a value of 3 in decimal (11 in binary) as the first value C0 in the bitstream, which corresponds to the first two significant bits of 110 and 111. Thus, in some aspects, the decoder 704 may partially decode the magnitude information of the x-component of the motion vector difference MVD0 from the bitstream. In the above example in which C0=3 (11 in binary) and assuming the value of MVD0's y-component to be 0, the possible values of the magnitude of the x-component of MVD0 are 6 (110 in binary) and 7 (111 in binary), and, considering the possible signs, the possible values of MVD0 would be (+6, 0), (−6, 0), (+7, 0) and (−7, 0). If MVD1 is assumed to be (+2, +2), then the set of motion vector difference hypotheses pairs determined in step 1402 is {{(+6, 0), (+2, +2)}, {(−6, 0), (+2, +2)}, {(+7, 0), (+2, +2)}, {(−7, 0), (+2, +2)}}. In some aspects, the set may contain all the possible combinations of the possible values of MVD0 and MVD1.

In some alternative aspects (e.g., some alternative partial magnitude aspects), the decoded value C0 may be used for partially deriving the magnitude of the MVD0's y-component. In this case, the decoder 704 may regenerate the remaining magnitude information as well as the sign information of the MVD0's y-component. In some other alternative aspects (e.g., some other alternative partial magnitude aspects), in step 1302, the decoder 704 may decode the first coded value C0 and may additionally decode a third coded value C2, the first value C0 may be used for partially deriving the magnitude of the MVD0's x-component, and the third value C2 may be used for partially deriving the magnitude of the MVD0's y-component.

In some aspects (e.g., some partial magnitude aspects), the second value C1 (e.g., decoded in step 1302 of the process 1300) may partially indicate the magnitude of the MVD1's x-component. In some aspects, the decoder 704 may regenerate the remaining magnitude information and the sign information of the x-component of the final motion vector difference MVD1 (e.g., in step 1306 and/or in step 1406). For example, in some aspects, the decoded value C1 may correspond to the most significant bits (MSBs) of the magnitude of MVD1's x-component. In some alternative aspects (e.g., some alternative partial magnitude aspects), the decoded value C1 may be used for partially deriving the magnitude of the MVD1's y-component. In this case, the decoder 704 may regenerate the remaining magnitude information as well as the sign information of the MVD1's y-component. In some other alternative aspects (e.g., some other alternative partial magnitude aspects), in step 1302, the decoder 704 may decode the second coded value C1 and may additionally decode a fourth coded value C3, the second value C1 may be used for partially deriving the magnitude of the MVD1's x-component, and the fourth value C3 may be used for partially deriving the magnitude of the MVD1's y-component.

In some aspects (e.g., some partial magnitude aspects), the number of least significant bits (LSBs) of the x- or y-component of a MVD that the decoder 704 needs to regenerate may be a constant. In some aspects, the number of LSBs of the x- or y-component of a MVD that the decoder 704 needs to regenerate may be signaled in a parameter set (e.g., a sequence parameter set (SPS) or a picture parameter set (PPS) or a slice header or a picture header). In some aspects, the number of LSBs that the decoder 704 may need to regenerate may be, for example, 1.

In some aspects (e.g., some complete or partial magnitude aspects), decoding partial MVD information and deriving the remaining MVD information may be enabled for an MVD's x- or y-component only when the decoded magnitude of the corresponding component exceeds a certain threshold T (e.g., 32 in 1/16 motion vector resolution). For example, in some complete magnitude aspects, where the decoded value C0 fully indicates the magnitude of the MVD0's x-component, the decoder 704 may compare the decoded value C0 to the threshold T and, when C0 is greater than T, the decoder 704 may regenerate or derive the remaining information (e.g., the sign) of the MVD0's x-component.

Figure 15:
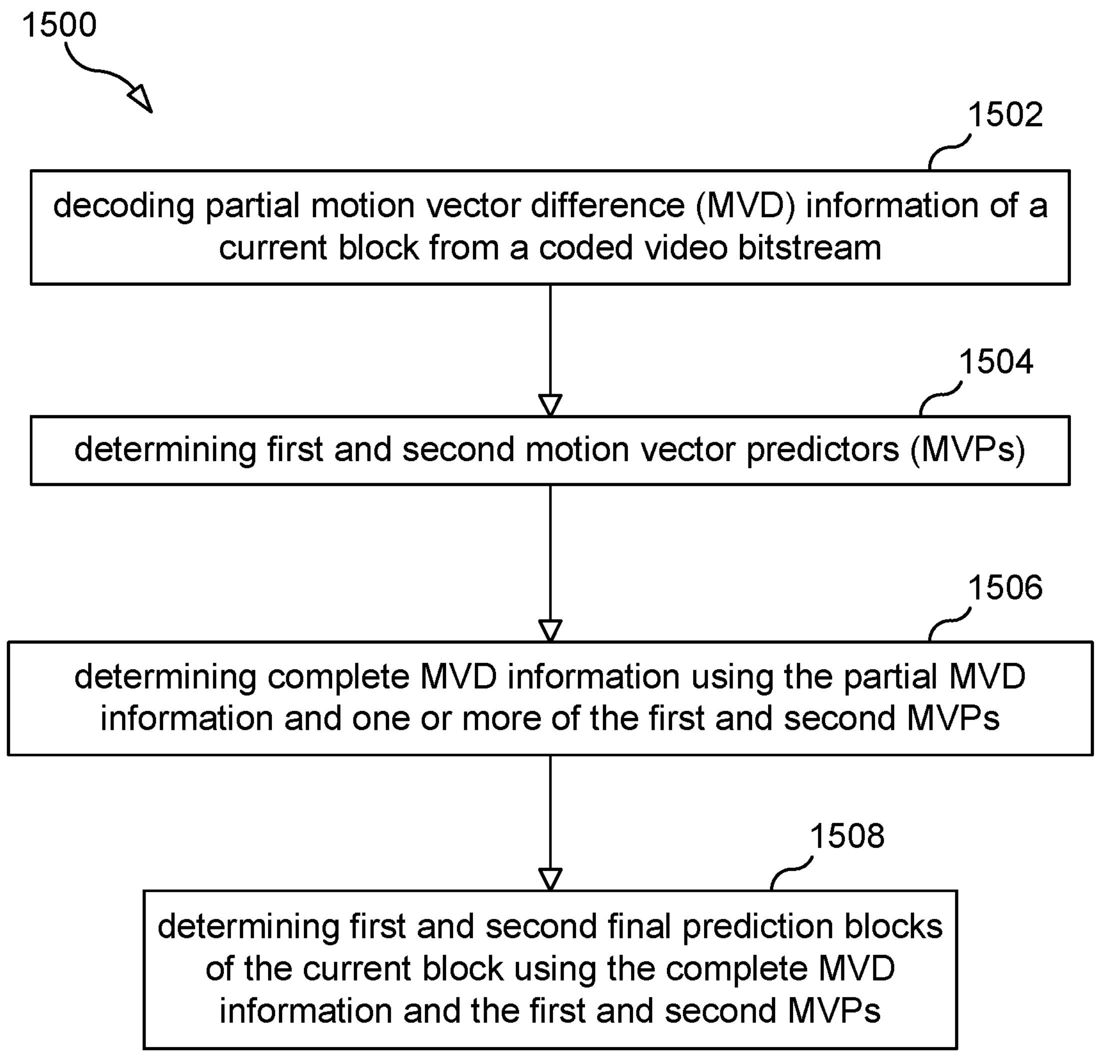
FIG. 15 is a flow chart illustrating a process according to some aspects.

FIG. 15 illustrates a process 1500 for processing (e.g., decoding) a current block within a current picture according to some aspects. In some aspects, the decoder 704 may perform some or all of the steps of the process 1500. In some aspects, as shown in FIG. 15, the process 1500 may include a step 1502 in which the decoder 704 decodes partial motion vector difference (MVD) information of the current block from a coded video bitstream. In some aspects, the process 1500 may include a step 1604 in which the decoder 704 determines first and second motion vector predictors (MVPs). In some aspects, the process 1500 may include a step 1506 in which the decoder 704 determines complete MVD information using the partial MVD information and one or more of the first and second MVPs. In some aspects, the process 1500 may include a step 1508 in which the decoder 704 determines first and second final prediction blocks of the current block using the complete MVD information and the first and second MVPs.

In some aspects, the partial MVD information decoded in step 1502 may include complete or partial magnitude information for first and second MVDs and may not include sign information for one or more of the first and second MVDs, and determining the complete MVD information in step 1506 may include determining sign information for one or more of the first and second MVDs. In some aspects, the partial MVD information decoded in step 1502 may include partial magnitude information for one or more of first and second MVDs, and determining the complete MVD information in step 1506 may include determining complete magnitude information for one or more of the first and second MVDs. In some aspects in which the partial MVD information decoded in step 1502 include partial magnitude information, the partial magnitude information may include one or more of the most significant bits of a magnitude of one of the first and second MVDs and may not include one or more of the least significant bits of the magnitude of the one of the first and second MVDs.

In some aspects, determining the complete MVD information in step 1506 may include using the partial MVD information to generate a set of MVD hypothesis pairs, and each of the MVD hypothesis pairs may include a possible first MVD and a possible second MVD. In some aspects, the set of MVD hypothesis pairs may include all combinations of possible first MVDs and possible second MVDs. In some aspects, the partial MVD information decoded in step 1502 may include first and second decoded values, the possible first MVDs of the MVD hypothesis pairs may be derived from the first decoded value, and the possible second MVDs of the MVD hypothesis pairs may be derived from the second decoded value.

In some aspects, the first decoded value of the partial MVD information may indicate a complete magnitude of an x-component of a first MVD, and an x-component of the possible first MVDs of the MVD hypothesis pairs may have the magnitude indicated by the first decoded value with either a positive or a negative sign. In some alternative aspects, the first decoded value of the partial MVD information may indicate a complete magnitude of a y-component of a first MVD, and a y-component of the possible first MVDs of the MVD hypothesis pairs may have the magnitude indicated by the first decoded value with either a positive or a negative sign. In some other alternative aspects, the partial MVD information may further include a third decoded value, the first decoded value may indicate a complete magnitude of an x-component of a first MVD, the third decoded value may indicate a complete magnitude of a y-component of the first MVD, an x-component of the possible first MVDs of the MVD hypothesis pairs may have the magnitude indicated by the first decoded value with either a positive or a negative sign, and a y-component of the possible first MVDs of the MVD hypothesis pairs may have the magnitude indicated by the third decoded value with either a positive or a negative sign.

In some aspects, the second decoded value of the partial MVD information may indicate a complete magnitude of an x-component of a second MVD, and an x-component of the possible second MVDs of the MVD hypothesis pairs may have the magnitude indicated by the second decoded value with either a positive or a negative sign. In some alternative aspects, the second decoded value of the partial MVD information may indicate a complete magnitude of a y-component of a second MVD, and a y-component of the possible second MVDs of the MVD hypothesis pairs may have the magnitude indicated by the second decoded value with either a positive or a negative sign. In some other alternative aspects, the partial MVD information may further include a fourth decoded value, the second decoded value of the partial MVD information may indicate a complete magnitude of an x-component of a second MVD, the fourth decoded value may indicate a complete magnitude of a y-component of the second MVD, an x-component of the possible second MVDs of the MVD hypothesis pairs may have the magnitude indicated by the second decoded value with either a positive or a negative sign, and a y-component of the possible second MVDs of the MVD hypothesis pairs may have the magnitude indicated by the fourth decoded value with either a positive or a negative sign.

In some aspects, the first decoded value of the partial MVD information may indicate a partial magnitude indicating possible magnitudes of an x-component of a first MVD, and an x-component of the possible first MVDs of the MVD hypothesis pairs may have a magnitude that is one of the possible magnitudes indicated by the first decoded value with either a positive or a negative sign. In some alternative aspects, the first decoded value of the partial MVD information may indicate a partial magnitude indicating possible magnitudes of a y-component of a first MVD, and a y-component of the possible first MVDs of the MVD hypothesis pairs may have a magnitude that is one of the possible magnitudes indicated by the first decoded value with either a positive or a negative sign. In some other alternative aspects, the partial MVD information may further include a third decoded value, the first decoded value of the partial MVD information may indicate a partial magnitude indicating possible magnitudes of an x-component of a first MVD, the third decoded value may indicate a partial magnitude indicating possible magnitudes of a y-component of the first MVD, an x-component of the possible first MVDs of the MVD hypothesis pairs may have a magnitude that is one of the possible magnitudes indicated by the first decoded value with either a positive or a negative sign, and a y-component of the possible first MVDs of the MVD hypothesis pairs may have a magnitude that is one of the possible magnitudes indicated by the third decoded value with either a positive or a negative sign.

In some aspects, the second decoded value of the partial MVD information may indicate a partial magnitude indicating possible magnitudes of an x-component of a second MVD, and an x-component of the possible second MVDs of the MVD hypothesis pairs may have a magnitude that is one of the possible magnitudes indicated by the second decoded value with either a positive or a negative sign. In some alternative aspects, the second decoded value of the partial MVD information may indicate a partial magnitude indicating possible magnitudes of a y-component of a second MVD, and a y-component of the possible second MVDs of the MVD hypothesis pairs may have a magnitude that is one of the possible magnitudes indicated by the second decoded value with either a positive or a negative sign. In some other alternative aspects, the partial MVD information may further include a fourth decoded value, the second decoded value of the partial MVD information may indicate a partial magnitude indicating possible magnitudes of an x-component of a second MVD, the fourth decoded value may indicate a partial magnitude indicating possible magnitudes of a y-component of the second MVD, an x-component of the possible second MVDs of the MVD hypothesis pairs may have a magnitude that is one of the possible magnitudes indicated by the second decoded value with either a positive or a negative sign, and a y-component of the possible second MVDs of the MVD hypothesis pairs may have a magnitude that is one of the possible magnitudes indicated by the fourth decoded value with either a positive or a negative sign.

In some aspects, determining the complete MVD information in step 1506 may further include, for each of the MVD hypothesis pairs: determining a first motion vector (MV) based on the first MVP and the possible first MVD of the MVD hypothesis pair, determining a first prediction block based on the first MV, determining a second MV based on the second MVP and the possible second MVD of the MVD hypothesis pair, determining a second prediction block based on the second MV, and determining a similarity score for the MVD hypothesis pair based on the first and second prediction blocks. In some aspects, the similarity score may be a sum of difference values between samples of the first and second prediction blocks, an absolute sample difference between samples of the first and second prediction blocks, an absolute mean-removed sample difference between samples of the first and second prediction blocks, or a squared sample difference between samples of the first and second prediction blocks. In some aspects, determining the complete MVD information in step 1506 may further include selecting a similarity metric based on a block size of the current block and calculating the similarities scores for the MVD hypothesis pairs using the selected similarity metric.

In some aspects, determining the complete MVD information in step 1506 may further include using the similarity scores for the MVD hypothesis pairs to select an MVD hypothesis pair of the set of MVD hypothesis pairs that produces the best similarity score, and the complete MVD information determined in step 1506 may be the selected MVD hypothesis pair. In some aspects, the best similarity score may indicate the smallest differences between the samples of the first and second prediction blocks determined for the MVD hypothesis pair. In some alternative aspects, the best similarity score may indicate the highest similarities between the samples of the first and second prediction blocks determined for the MVD hypothesis pair.

In some aspects, if two or more MVD hypothesis pairs produce the best similarity score, the selected MVD hypothesis pair may be the MVD hypothesis pair of the two or more MVD hypothesis pairs that produces first and second MVs having the highest similarity in terms of signs to the first and second MVPs. In some alternative aspects, the MVD hypothesis pairs of the set of MVD hypothesis pairs may be evaluated in predetermined order, and, if two or more MVD hypothesis pairs produce the best similarity score, the selected MVD hypothesis pair may be the MVD hypothesis pair of the two or more MVD hypothesis pairs that first produced the best similarity score. In some other alternative aspects, the MVD hypothesis pairs of the set of MVD hypothesis pairs may be evaluated in predetermined order, and, if two or more MVD hypothesis pairs produce the best similarity score, the selected MVD hypothesis pair may be the MVD hypothesis pair of the two or more MVD hypothesis pairs that last produced the best similarity score. In some further alternative aspects, determining the complete MVD information may further include determining that only one MVD hypothesis pair of the set of MVD hypothesis pairs that produces the best similarity score, and, if two or more MVD hypothesis pairs were determined to produce the best similarity score, the decoder 704 would decode the remaining MVD information from the coded video bitstream instead of selecting one of the two or more MVD hypothesis pairs that produced the best similarity score.

In some aspects, the possible first MVD of the MVD hypothesis pair selected in step 1506 and the first MVP determined in step 1504 may be used to determine the first final prediction block in step 1508, and the possible second MVD of the MVD hypothesis pair selected in step 1506 and the second MVP determined in step 1504 may be used to determine the second final prediction block in step 1508.

In some aspects, determining the first and second final prediction blocks in step 1508 may include using an interpolation filter having longer filter taps than an interpolation filter used to determine the first and second prediction blocks in determining the complete MVD information in step 1506. In some aspects, determining the first and second prediction blocks in step 1506 based on the first and second MVs, respectively, in determining the complete MVD information may include rounding the first and second MVs and using the rounded first and second MVs to determine the first and second prediction blocks, respectively.

In some aspects, the process 1500 may further include a step in which the decoder 704 decodes a flag (e.g., a block level flag) from the coded video bitstream, the decoded flag may have a value that indicates that the partial MVD information of the current block is present in the coded video bitstream and that the complete MVD information of the current block must be determined. In some aspects, if the decoded flag instead had a value that indicates that complete MVD information of the current block is present in the coded video bitstream, the decoder 704 may decode the complete MVD information of the current block from the coded video bitstream (instead of decoding the partial MVD information and determining the complete MVD information).

In some aspects, the process 1500 may further include a step in which the decoder 704 determines that the current block has a motion vector resolution (e.g., a non-fractional resolution) coarser than a certain resolution (e.g., a fractional resolution). In some aspects, if the decoder 704 instead determined that the current block does not have a motion vector resolution coarser than the certain resolution, the decoder 704 may decode the complete MVD information from the coded video bitstream (instead of decoding the partial MVD information and determining the complete MVD information).

In some aspects, the process 1500 may further include a step in which the decoder 704 determines that the current picture has a first reference picture with a picture order count (POC) smaller than the POC of the current picture and a second reference picture with a POC smaller than the POC of the current picture. In some aspects, if the decoder 704 instead determined that the current picture does not have the first and second reference pictures, the decoder 704 may decode the complete MVD information from the coded video bitstream (instead of decoding the partial MVD information and determining the complete MVD information).

In some aspects (e.g., some aspects in which the partial MVD information decoded in step 1502 includes first and second decoded values, the possible first MVDs of the MVD hypothesis pairs may be derived from the first decoded value, and the possible second MVDs of the MVD hypothesis pairs may be derived from the second decoded value), the process 1500 may further include a step in which the decoder 704 determines that the first decoded value is greater than a threshold and/or determines that the second decoded value is greater than a threshold. In some aspects, the first decoded value (and/or the second decoded value) is not greater than the threshold, the decoder 704 may decode the complete MVD information from the coded video bitstream (instead of determining the complete MVD information).

Figure 16:
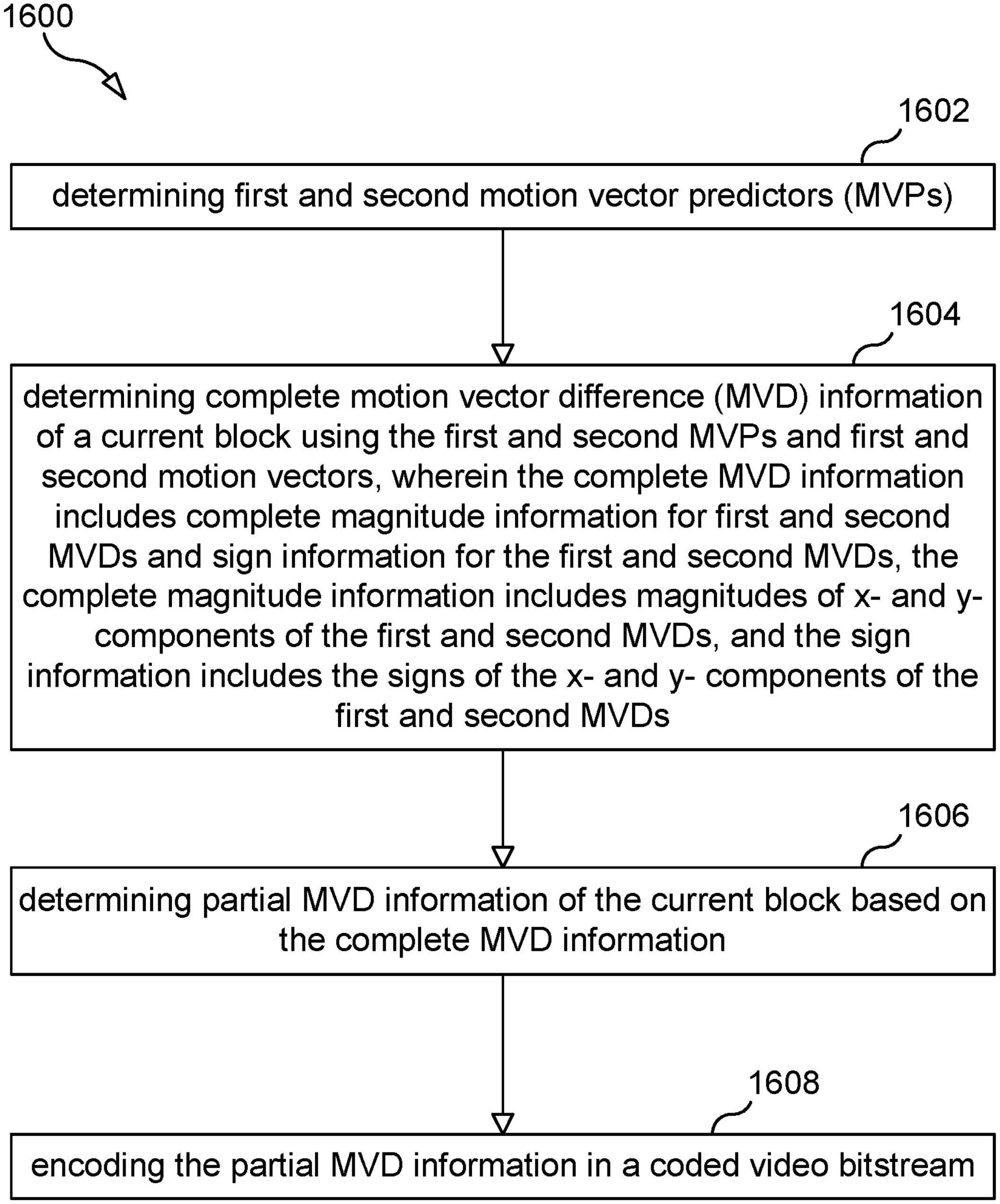
FIG. 16 is a flow chart illustrating a process according to some aspects.

FIG. 16 illustrates a process 1600 for processing (e.g., encoding) a current block within a current picture according to some aspects. In some aspects, the encoder 702 may perform some or all of the steps of the process 1600. In some aspects, as shown in FIG. 16, the process 1600 may include a step 1602 in which the encoder 702 determines first and second motion vector predictors (MVPs). In some aspects, the process 1600 may include a step 1604 in which the encoder 702 determines complete motion vector difference (MVD) information of the current block using the first and second MVPs and first and second motion vectors. In some aspects, the complete MVD information may include complete magnitude information for first and second MVDs and sign information for the first and second MVDs, the complete magnitude information may include magnitudes of x- and y-components of the first and second MVDs, and the sign information may include the signs of the x- and y-components of the first and second MVDs. In some aspects, the process 1600 may include a step 1606 in which the encoder 702 determines partial MVD information of the current block based on the complete MVD information. In some aspects, the process 1600 may include a step 1608 in which the encoder 702 encodes the partial MVD information in a coded video bitstream.

In some aspects, the partial MVD information determined in step 1606 and encoded in step 1608 may include the complete magnitude information or partial magnitude information for first and second MVDs and may not include the sign information. In some aspects, the partial MVD information may include partial magnitude information for one or more of first and second MVDs. In some aspects, the partial magnitude information may include one or more of the most significant bits of a magnitude of one of the first and second MVDs and may not include one or more of the least significant bits of the magnitude of the one of the first and second MVDs.

In some aspects, the process 1600 may further include a step in which the encoder 702 uses the partial MVD information to generate a set of MD hypothesis pairs, and each of the MVD hypothesis pairs may include a possible first MVD and a possible second MVD. In some aspects, the method may further include the encoder 702, for each of the MVD hypothesis pairs: determining a first motion vector (MV) based on the first MVP and the possible first MVD of the MVD hypothesis pair; determining a first prediction block based on the first MV; determining a second MV based on the second MVP and the possible second MVD of the MVD hypothesis pair; determining a second prediction block based on the second MV; and determining a similarity score for the MVD hypothesis pair based on the first and second prediction blocks. In some aspects, the process 1600 may further include determining that only one of the MVD hypothesis pairs produces a best similarity score, and the partial MVD information may be encoded if only one of the MVD hypothesis pairs is determined to produce the best similarity score. In some aspects, if the encoder 702 instead determined that more than one of the MVD hypothesis pairs produces the best similarity score, the encoder 702 may encode the complete MVD information in the coded video bitstream instead of encoding the partial MVD information.

In some aspects, the process 1600 may further include a step in which the encoder 702 determines that the current block has a motion vector resolution (e.g., a non-fractional resolution) coarser than a certain resolution (e.g., a fractional resolution), and the partial MVD information may be encoded if the motion vector resolution of the current block is determined to be coarser than the certain resolution. In some aspects, if the encoder 702 determined that the current block has a motion vector resolution that is not coarser than the certain resolution, the encoder 702 may encode the complete MVD information in the coded video bitstream instead of encoding the partial MVD information in the coded video bitstream.

In some aspects, the process 1600 may further include a step in which the encoder 702 determines that the current picture has a first reference picture with a picture order count (POC) smaller than the POC of the current picture and a second reference picture with a POC smaller than the POC of the current picture, and the partial MVD information may be encoded if the current picture has the first and second reference pictures. In some aspects, the if the encoder 702 determined that the current picture does not have the first and second reference pictures, the encoder 702 may encode the complete MVD information in the coded video bitstream instead of encoding the partial MVD information in the coded video bitstream.

In some aspects, the process 1600 may further include a step in which the encoder 702 encodes a flag (e.g., a block level flag) in the coded video bitstream, and the flag may have a value that indicates that the partial MVD information of the current block is present in the coded video bitstream and that the decoder 704 must determine the complete MVD information of the current block. In some aspects, if the encoder 702 encoded the complete MVD information in the coded video bitstream (instead of encoding the partial MVD information in the coded video bitstream), the flag may instead have a value that indicates that complete MVD information of the current block is present in the coded video bitstream.

Figure 17:
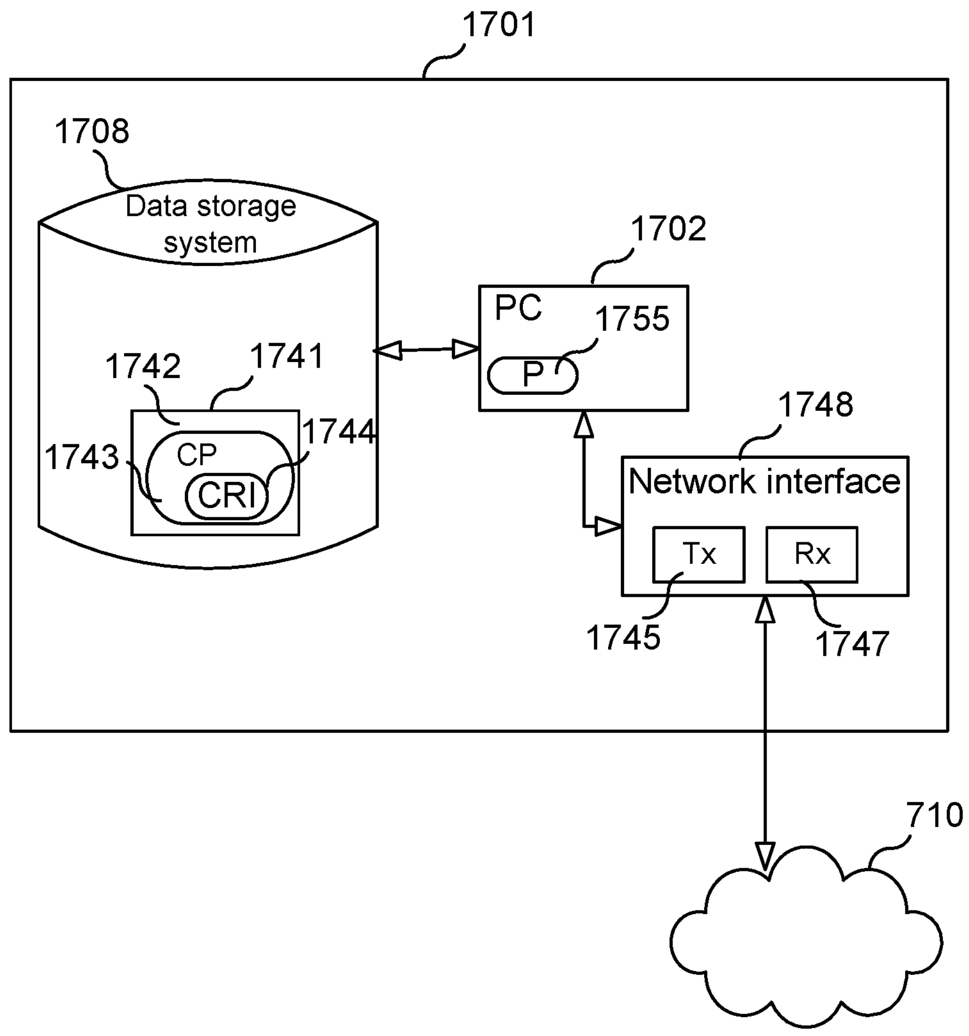
FIG. 17 is a block diagram of an apparatus according to some aspects.

FIG. 17 is a block diagram of an apparatus 1701 for implementing the encoder 702 or the decoder 704 according to some aspects. That is, apparatus 1701 can be adapted to perform the methods disclosed herein. In aspects where the apparatus 1701 implements the encoder 702, the apparatus 1701 may be referred to as "encoding apparatus 1701," and, in aspects where the apparatus 1701 implements the decoder 704, the apparatus 1701 may be referred to as a "decoding apparatus 1701." As shown in FIG. 17, the apparatus 1701 may comprise: processing circuitry (PC) 1702, which may include one or more processors (P) 1755 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 1701 may be a distributed computing apparatus); at least one network interface 1748 comprising a transmitter (Tx) 1745 and a receiver (Rx) 1747 for enabling apparatus 1701 to transmit data to and receive data from other nodes connected to a network 710 (e.g., an Internet Protocol (IP) network) to which network interface 1748 is connected (directly or indirectly) (e.g., network interface 1748 may be wirelessly connected to the network 210, in which case network interface 1748 is connected to an antenna arrangement); and/or a storage unit (a.k.a., "data storage system") 1708, which may include one or more non-volatile storage devices and/or one or more volatile storage devices. In aspects where PC 1702 includes a programmable processor, a computer program product (CPP) 1741 may be provided. In some aspects, the CPP 1741 may include a computer readable medium (CRM) 1742 storing a computer program (CP) 1743 comprising computer readable instructions (CRI) 1744. The CRM 1742 may be a non-transitory computer readable medium, such as, magnetic media (e.g., a hard disk), optical media, memory devices (e.g., random access memory, flash memory), and the like. In some aspects, the CRI 1744 of computer program 1743 is configured such that when executed by PC 1702, the CRI causes apparatus 1701 to perform steps described herein (e.g., steps described herein with reference to the flow charts of FIGS. 13-16). In some other aspects, the apparatus 1701 may be configured to perform steps described herein without the need for code. That is, for example, PC 1702 may consist merely of one or more ASICs. Hence, the features of the embodiments described herein may be implemented in hardware and/or software.

SUMMARY OF EMBODIMENTS

A1. A method (1500) for processing (e.g., decoding) a current block within a current picture, the method comprising: decoding partial motion vector difference (MVD) information of the current block from a coded video bitstream; determining first and second motion vector predictors (MVPs); determining complete MVD information using the partial MVD information and one or more of the first and second MVPs; and determining first and second final prediction blocks of the current block using the complete MVD information and the first and second MVPs.

A2. The method of embodiment A1, wherein the partial MVD information includes complete or partial magnitude information for first and second MVDs and does not include sign information for one or more of the first and second MVDs, and determining the complete MVD information includes determining sign information for one or more of the first and second MVDs.

A3. The method of embodiment A1 or A2, wherein the partial MVD information includes partial magnitude information for one or more of first and second MVDs, and determining the complete MVD information includes determining complete magnitude information for one or more of the first and second MVDs.

A4. The method of embodiment A3, wherein the partial magnitude information includes one or more of the most significant bits of a magnitude of one of the first and second MVDs and does not include one or more of the least significant bits of the magnitude of the one of the first and second MVDs.

A5. The method of any one of embodiments A1-A4, wherein determining the complete MVD information comprises using the partial MVD information to generate a set of MVD hypothesis pairs, and each of the MVD hypothesis pairs includes a possible first MVD and a possible second MVD.

A6. The method of embodiment A5, wherein the set of MVD hypothesis pairs includes all combinations of possible first MVDs and possible second MVDs.

A7. The method of embodiment A5 or A6, wherein the partial MVD information includes first and second decoded values, the possible first MVDs of the MVD hypothesis pairs are derived from the first decoded value, and the possible second MVDs of the MVD hypothesis pairs are derived from the second decoded value.

A8. The method of embodiment A7, wherein the first decoded value indicates a complete magnitude of an x-component of a first MVD, and an x-component of the possible first MVDs of the MVD hypothesis pairs has the magnitude indicated by the first decoded value with either a positive or a negative sign.

A9. The method of embodiment A7, wherein the first decoded value indicates a complete magnitude of a y-component of a first MVD, and a y-component of the possible first MVDs of the MVD hypothesis pairs has the magnitude indicated by the first decoded value with either a positive or a negative sign.

A10. The method of embodiment A7, wherein the partial MVD information further includes a third decoded value, the first decoded value indicates a complete magnitude of an x-component of a first MVD, the third decoded value indicates a complete magnitude of a y-component of the first MVD, an x-component of the possible first MVDs of the MVD hypothesis pairs has the magnitude indicated by the first decoded value with either a positive or a negative sign, and a y-component of the possible first MVDs of the MVD hypothesis pairs has the magnitude indicated by the third decoded value with either a positive or a negative sign.

All. The method of any one of embodiments A7-A10, wherein the second decoded value indicates a complete magnitude of an x-component of a second MVD, and an x-component of the possible second MVDs of the MVD hypothesis pairs has the magnitude indicated by the second decoded value with either a positive or a negative sign.

A12. The method of any one of embodiments A7-A10, wherein the second decoded value indicates a complete magnitude of a y-component of a second MVD, and a y-component of the possible second MVDs of the MVD hypothesis pairs has the magnitude indicated by the second decoded value with either a positive or a negative sign.

A13. The method of any one of embodiments A7-A10, wherein the partial MVD information further includes a fourth decoded value, the second decoded value indicates a complete magnitude of an x-component of a second MVD, the fourth decoded value indicates a complete magnitude of a y-component of the second MVD, an x-component of the possible second MVDs of the MVD hypothesis pairs has the magnitude indicated by the second decoded value with either a positive or a negative sign, and a y-component of the possible second MVDs of the MVD hypothesis pairs has the magnitude indicated by the fourth decoded value with either a positive or a negative sign.

A14. The method of embodiment A7, wherein the first decoded value indicates a partial magnitude indicating possible magnitudes of an x-component of a first MVD, and an x-component of the possible first MVDs of the MVD hypothesis pairs has a magnitude that is one of the possible magnitudes indicated by the first decoded value with either a positive or a negative sign.

A15. The method of embodiment A7, wherein the first decoded value indicates a partial magnitude indicating possible magnitudes of a y-component of a first MVD, and a y-component of the possible first MVDs of the MVD hypothesis pairs has a magnitude that is one of the possible magnitudes indicated by the first decoded value with either a positive or a negative sign.

A16. The method of embodiment A7, wherein the partial MVD information further includes a third decoded value, the first decoded value indicates a partial magnitude indicating possible magnitudes of an x-component of a first MVD, the third decoded value indicates a partial magnitude indicating possible magnitudes of a y-component of the first MVD, an x-component of the possible first MVDs of the MVD hypothesis pairs has a magnitude that is one of the possible magnitudes indicated by the first decoded value with either a positive or a negative sign, and a y-component of the possible first MVDs of the MVD hypothesis pairs has a magnitude that is one of the possible magnitudes indicated by the third decoded value with either a positive or a negative sign.

A17. The method of any one of embodiments A7 and A14-A16, wherein the second decoded value indicates a partial magnitude indicating possible magnitudes of an x-component of a second MVD, and an x-component of the possible second MVDs of the MVD hypothesis pairs has a magnitude that is one of the possible magnitudes indicated by the second decoded value with either a positive or a negative sign.

A18. The method of any one of embodiments A7 and A14-A16, wherein the second decoded value indicates a partial magnitude indicating possible magnitudes of a y-component of a second MVD, and a y-component of the possible second MVDs of the MVD hypothesis pairs has a magnitude that is one of the possible magnitudes indicated by the second decoded value with either a positive or a negative sign.

A19A. The method of any one of embodiments A7 and A14-A16, wherein the partial MVD information further includes a fourth decoded value, the second decoded value indicates a partial magnitude indicating possible magnitudes of an x-component of a second MVD, the fourth decoded value indicates a partial magnitude indicating possible magnitudes of a y-component of the second MVD, an x-component of the possible second MVDs of the MVD hypothesis pairs has a magnitude that is one of the possible magnitudes indicated by the second decoded value with either a positive or a negative sign, and a y-component of the possible second MVDs of the MVD hypothesis pairs has a magnitude that is one of the possible magnitudes indicated by the fourth decoded value with either a positive or a negative sign.

A19B. The method of any one of embodiments A7-A19A, further comprising determining that the first decoded value is greater than a threshold.

A20. The method of any one of embodiments A5-A19B, wherein determining the complete MVD information further comprises, for each of the MVD hypothesis pairs: determining a first motion vector (MV) based on the first MVP and the possible first MVD of the MVD hypothesis pair; determining a first prediction block based on the first MV; determining a second MV based on the second MVP and the possible second MVD of the MVD hypothesis pair; determining a second prediction block based on the second MV; and determining a similarity score for the MVD hypothesis pair based on the first and second prediction blocks.

A21. The method of embodiment A20, wherein the similarity score is a sum of difference values between samples of the first and second prediction blocks, an absolute sample difference between samples of the first and second prediction blocks, an absolute mean-removed sample difference between samples of the first and second prediction blocks, or a squared sample difference between samples of the first and second prediction blocks.

A22. The method of embodiment A20 or A21, wherein determining the complete MVD information further comprises: selecting a similarity metric based on a block size of the current block; and calculating the similarities scores for the MVD hypothesis pairs using the selected similarity metric.

A23. The method of any one of embodiments A20-A22, wherein determining the complete MVD information further comprises using the similarity scores for the MVD hypothesis pairs to select an MVD hypothesis pair of the set of MVD hypothesis pairs that produces the best similarity score, and the complete MVD information is the selected MVD hypothesis pair.

A24. The method of embodiment A23, wherein the best similarity score indicates the smallest differences between the samples of the first and second prediction blocks determined for the MVD hypothesis pair.

A25. The method of embodiment A23, wherein the best similarity score indicates the highest similarities between the samples of the first and second prediction blocks determined for the MVD hypothesis pair.

A26. The method of any one of embodiments A23-A25, wherein, if two or more MVD hypothesis pairs produce the best similarity score, the selected MVD hypothesis pair is the MVD hypothesis pair of the two or more MVD hypothesis pairs that produces first and second MVs having the highest similarity in terms of signs to the first and second MVPs.

A27. The method of any one of embodiments A23-A25, wherein the MVD hypothesis pairs of the set of MVD hypothesis pairs are evaluated in predetermined order, and, if two or more MVD hypothesis pairs produce the best similarity score, the selected MVD hypothesis pair is the MVD hypothesis pair of the two or more MVD hypothesis pairs that first produced the best similarity score.

A28. The method of any one of embodiments A23-A25, wherein the MVD hypothesis pairs of the set of MVD hypothesis pairs are evaluated in predetermined order, and, if two or more MVD hypothesis pairs produce the best similarity score, the selected MVD hypothesis pair is the MVD hypothesis pair of the two or more MVD hypothesis pairs that last produced the best similarity score.

A29. The method of any one of embodiments A23-A25, wherein determining the complete MVD information further comprises determining that only one MVD hypothesis pair of the set of MD hypothesis pairs that produces the best similarity score.

A30. The method of any one of embodiments A23-A29, wherein the possible first MVD of the selected MVD hypothesis pair and the first MVP are used to determine the first final prediction block, and the possible second MVD of the selected MVD hypothesis pair and the second MVP are used to determine the second final prediction block.

A31. The method of any one of embodiments A20-A30, wherein determining the first and second final prediction blocks comprises using an interpolation filter having longer filter taps than an interpolation filter used to determine the first and second prediction blocks in determining the complete MVD information.

A32. The method of any one of embodiments A20-A31, wherein determining the first and second prediction blocks based on the first and second MVs, respectively, comprises rounding the first and second MVs and using the rounded first and second MVs to determine the first and second prediction blocks, respectively.

A33. The method of any one of embodiments A1-A32, further comprising decoding a flag (e.g., a block level flag) from the coded video bitstream, wherein the decoded flag has a value that indicates that the partial MVD information of the current block is present in the coded video bitstream and that the complete MVD information of the current block must be determined.

A34. The method of any one of embodiments A1-A33, further comprising determining that the current block has a motion vector resolution (e.g., a non-fractional resolution) coarser than a certain resolution (e.g., a fractional resolution).

A35. The method of any one of embodiments A1-A34, further comprising determining that the current picture has a first reference picture with a picture order count (POC) smaller than the POC of the current picture and a second reference picture with a POC smaller than the POC of the current picture.

B1. A decoder (704) configured to: decode partial motion vector difference (MVD) information of a current block within a current picture from a coded video bitstream; determine first and second motion vector predictors (MVPs); determine complete MVD information using the partial MVD information and one or more of the first and second MVPs; and determine first and second final prediction blocks of the current block using the complete MVD information and the first and second MVPs.

C1. A method (1600) for processing (e.g., encoding) a current block within a current picture, the method comprising: determining first and second motion vector predictors (MVPs); determining complete motion vector difference (MVD) information of the current block using the first and second MVPs and first and second motion vectors, wherein the complete MVD information includes complete magnitude information for first and second MVDs and sign information for the first and second MVDs, the complete magnitude information includes magnitudes of x- and y-components of the first and second MVDs, and the sign information includes the signs of the x- and y-components of the first and second MVDs; determining partial MVD information of the current block based on the complete MVD information; and encoding the partial MVD information in a coded video bitstream.

C2. The method of embodiment C1, wherein the partial MVD information includes the complete magnitude information or partial magnitude information for first and second MVDs and does not include the sign information.

C3. The method of embodiment C1 or C2, wherein the partial MVD information includes partial magnitude information for one or more of first and second MVDs.

C4. The method of embodiment C3, wherein the partial magnitude information includes one or more of the most significant bits of a magnitude of one of the first and second MVDs and does not include one or more of the least significant bits of the magnitude of the one of the first and second MVDs.

C5. The method of any one of embodiments C1-C4, further comprising: using the partial MVD information to generate a set of MVD hypothesis pairs, wherein each of the MVD hypothesis pairs includes a possible first MVD and a possible second MVD; for each of the MVD hypothesis pairs: determining a first motion vector (MV) based on the first MVP and the possible first MVD of the MVD hypothesis pair; determining a first prediction block based on the first MV; determining a second MV based on the second MVP and the possible second MVD of the MVD hypothesis pair; determining a second prediction block based on the second MV; and determining a similarity score for the MVD hypothesis pair based on the first and second prediction blocks; and determining that only one of the MVD hypothesis pairs produces a best similarity score, wherein the partial MVD information is encoded if only one of the MVD hypothesis pairs is determined to produce the best similarity score.

C6. The method of any one of embodiments C1-C4, further comprising determining that the current block has a motion vector resolution (e.g., a non-fractional resolution) coarser than a certain resolution (e.g., a fractional resolution), wherein the partial MVD information is encoded if the motion vector resolution of the current block is determined to be coarser than the certain resolution.

C7. The method of any one of embodiments C1-C6, further comprising determining that the current picture has a first reference picture with a picture order count (POC) smaller than the POC of the current picture and a second reference picture with a POC smaller than the POC of the current picture, wherein the partial MVD information is encoded if the current picture has the first and second reference pictures.

C8. The method of any one of embodiments C1-C7, further comprising encoding a flag (e.g., a block level flag) in the coded video bitstream, wherein the flag has a value that indicates that the partial MVD information of the current block is present in the coded video bitstream and that a decoder (704) must determine the complete MVD information of the current block.

D1. An encoder (702) configured to: determine first and second motion vector predictors (MVPs); determine complete motion vector difference (MVD) information of a current block within a current picture using the first and second MVPs and first and second motion vectors, wherein the complete MVD information includes complete magnitude information for first and second MVDs and sign information for the first and second MVDs, the complete magnitude information includes magnitudes of x- and y-components of the first and second MVDs, and the sign information includes the signs of the x- and y-components of the first and second MVDs; determine partial MVD information of the current block based on the complete MVD information; and encode the partial MVD information in a coded video bitstream.

E1. A computer program comprising instructions for adapting an apparatus to perform the method of any one of embodiments A1-A35 and C1-C8.

F1. A carrier containing the computer program of embodiment E1, wherein the carrier is one of an electronic signal, optical signal, radio signal, or compute readable storage medium.

G1. An apparatus (702, 704, 1700), the apparatus comprising: processing circuitry (1702); and a memory (1742), said memory containing instructions (1744) executable by said processing circuitry, whereby said apparatus is operative to perform the method of any one of the embodiments A1-A35 and C1-C8.

H1. An apparatus (702, 704, 1700) adapted to perform the method of any one of embodiments A1-A35 and C1-C8.

I1. Any combination of the embodiments set forth above.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for processing a current block within a current picture, the method comprising:

decoding partial motion vector difference (MVD) information of the current block from a coded video bitstream;

determining first and second motion vector predictors (MVPs);

determining complete MVD information by using the partial MVD information to generate a set of MVD hypothesis pairs, wherein the MVD hypothesis pairs comprise any or all combinations of a possible first MVD and a possible second MVD, wherein determining the complete MVD information further comprises, for each of the MVD hypothesis pairs:

determining a first motion vector (MV) based on the first MVP and the possible first MVD of the MVD hypothesis pair;

determining a first prediction block based on the first MV;

determining a second MV based on the second MVP and the possible second MVD of the MVD hypothesis pair;

determining a second prediction block based on the second MV; and determining a similarity score for the MVD hypothesis pair based on the first and second prediction blocks, wherein the similarity score is one of:

a sum of differences between values of samples of the first and second prediction blocks;

a sum of absolute sample differences between values of samples of the first and second prediction blocks;

a sum of absolute mean-removed sample differences between values of samples of the first and second prediction blocks; and a sum of squared sample differences between values of samples of the first and second prediction blocks;

wherein determining the complete MVD information further comprises using the similarity scores for the MVD hypothesis pairs to select an MVD hypothesis pair of the set of MVD hypothesis pairs that produces the best similarity score, wherein the best similarity score is the similarity score that indicates the smallest differences or the highest similarities between the values of samples of the first and second prediction blocks determined for the MVD hypothesis pair, wherein the complete MVD information is the selected MVD hypothesis pair, and wherein either:

(a) if two or more MVD hypothesis pairs produce the best similarity score, the selected MVD hypothesis pair is the MVD hypothesis pair of the two or more MVD hypothesis pairs that produces first and second MVs having the highest similarity in terms of signs to the first and second MVPs, or (b) the MVD hypothesis pairs of the set of MVD hypothesis pairs are evaluated in predetermined order, and, if two or more MVD hypothesis pairs produce the best similarity score, the selected MVD hypothesis pair is the MVD hypothesis pair of the two or more MVD hypothesis pairs that first produced the best similarity score; and determining first and second final prediction blocks of the current block using the complete MVD information and the first and second MVPs.

2. The method of claim 1, wherein the partial MVD information includes complete or partial magnitude information for first and second MVDs and does not include sign information for one or more of the first and second MVDs, and determining the complete MVD information includes determining sign information for one or more of the first and second MVDs.

3. The method of claim 1, wherein the partial MVD information includes partial magnitude information for one or more of first and second MVDs, and determining the complete MVD information includes determining complete magnitude information for one or more of the first and second MVDs.

4. The method of claim 3, wherein the partial magnitude information includes one or more of the most significant bits of a magnitude of one of the first and second MVDs and does not include one or more of the least significant bits of the magnitude of the one of the first and second MVDs.

5. The method of claim 1, wherein the partial MVD information includes first and second decoded values, the possible first MVDs of the MVD hypothesis pairs are derived from the first decoded value, and the possible second MVDs of the MVD hypothesis pairs are derived from the second decoded value.

6. The method of claim 5, wherein the first decoded value indicates a complete magnitude of an x-component of a first MVD, and an x-component of the possible first MVDs of the MVD hypothesis pairs has the magnitude indicated by the first decoded value with either a positive or a negative sign.

7. The method of claim 5, wherein the first decoded value indicates a partial magnitude indicating possible magnitudes of an x-component of a first MVD, and an x-component of the possible first MVDs of the MVD hypothesis pairs has a magnitude that is one of the possible magnitudes indicated by the first decoded value with either a positive or a negative sign.

8. The method of claim 5, further comprising determining that the first decoded value is greater than a threshold.

9. The method of claim 1, further comprising at least one of the following steps:

decoding a flag from the coded video bitstream, wherein the decoded flag has a value that indicates that the partial MVD information of the current block is present in the coded video bitstream and that the complete MVD information of the current block must be determined;

determining that the current block has a motion vector resolution coarser than a certain resolution; and determining that the current picture has a first reference picture with a picture order count (POC) smaller than the POC of the current picture and a second reference picture with a POC smaller than the POC of the current picture.

10. A decoder comprising:

processing circuitry; and a non-transitory computer readable medium comprising computer-readable instructions that, when executed by the processing circuitry, cause the decoder to:

decode partial motion vector difference (MVD) information of a current block within a current picture from a coded video bitstream;

determine first and second motion vector predictors (MVPs);

determine complete MVD information by using the partial MVD information to generate a set of MVD hypothesis pairs, wherein the MVD hypothesis pairs comprise any or all combinations of a possible first MVD and a possible second MVD, wherein to determine the complete MVD information the decoder is configured, for each of the MVD hypothesis pairs, to:

determine a first motion vector (MV) based on the first MVP and the possible first MVD of the MVD hypothesis pair;

determine a first prediction block based on the first MV;

determine a second MV based on the second MVP and the possible second MVD of the MVD hypothesis pair;

determine a second prediction block based on the second MV; and determine a similarity score for the MVD hypothesis pair based on the first and second prediction blocks, wherein the similarity score is one of:

a sum of differences between values of samples of the first and second prediction blocks;

a sum of absolute sample differences between values of samples of the first and second prediction blocks;

a sum of absolute mean-removed sample differences between values of samples of the first and second prediction blocks; and a sum of squared sample differences between values of samples of the first and second prediction blocks;

wherein determining the complete MVD information further comprises using the similarity scores for the MVD hypothesis pairs to select an MVD hypothesis pair of the set of MVD hypothesis pairs that produces the best similarity score, wherein the best similarity score is the similarity score that indicates the smallest differences or the highest similarities between the values of samples of the first and second prediction blocks determined for the MVD hypothesis pair, wherein the complete MVD information is the selected MVD hypothesis pair, and wherein either:

(a) if two or more MVD hypothesis pairs produce the best similarity score, the selected MVD hypothesis pair is the MVD hypothesis pair of the two or more MVD hypothesis pairs that produces first and second MVs having the highest similarity in terms of signs to the first and second MVPs, or (b) the MVD hypothesis pairs of the set of MVD hypothesis pairs are evaluated in predetermined order, and, if two or more MVD hypothesis pairs produce the best similarity score, the selected MVD hypothesis pair is the MVD hypothesis pair of the two or more MVD hypothesis pairs that first produced the best similarity score; and determine first and second final prediction blocks of the current block using the complete MVD information and the first and second MVPs.

11. A method for processing a current block within a current picture, the method comprising:

determining first and second motion vector predictors (MVPs);

determining complete motion vector difference (MVD) information of the current block using the first and second MVPs and first and second motion vectors, wherein the complete MVD information includes complete magnitude information for first and second MVDs and sign information for the first and second MVDs, the complete magnitude information includes magnitudes of x- and y-components of the first and second MVDs, and the sign information includes the signs of the x- and y-components of the first and second MVDs;

determining partial MVD information of the current block based on the complete MVD information;

determining that the current picture has a first reference picture with a picture order count (POC) smaller than a POC of the current picture and a second reference picture with a POC smaller than the POC of the current picture; and encoding the partial MVD information in a coded video bitstream if the current picture has the first and second reference pictures.

12. The method of claim 11, wherein the partial MVD information includes the complete magnitude information or partial magnitude information for first and second MVDs and does not include the sign information.

13. The method of claim 11, wherein the partial MVD information includes partial magnitude information for one or more of first and second MVDs.

14. The method of claim 13, wherein the partial magnitude information includes one or more of the most significant bits of a magnitude of one of the first and second MVDs and does not include one or more of the least significant bits of the magnitude of the one of the first and second MVDs.

15. The method of claim 11, further comprising:

using the partial MVD information to generate a set of MVD hypothesis pairs, wherein each of the MVD hypothesis pairs includes a possible first MVD and a possible second MVD;

for each of the MVD hypothesis pairs:

determining a first motion vector (MV) based on the first MVP and the possible first MVD of the MVD hypothesis pair;

determining a first prediction block based on the first MV;

determining a second MV based on the second MVP and the possible second MVD of the MVD hypothesis pair;

determining a second prediction block based on the second MV; and determining a similarity score for the MVD hypothesis pair based on the first and second prediction blocks; and determining that only one of the MVD hypothesis pairs produces a best similarity score, wherein the partial MVD information is encoded if only one of the MVD hypothesis pairs is determined to produce the best similarity score.

16. The method of claim 11, further comprising determining that the current block has a motion vector resolution coarser than a certain resolution, wherein the partial MVD information is encoded if the motion vector resolution of the current block is determined to be coarser than the certain resolution.

17. The method of claim 11, further comprising encoding a flag in the coded video bitstream, wherein the flag has a value that indicates that the partial MVD information of the current block is present in the coded video bitstream and that a decoder (704) must determine the complete MVD information of the current block.

18. An encoder comprising:

processing circuitry; and a non-transitory computer readable medium comprising computer-readable instructions that, when executed by the processing circuitry, cause the encoder to:

determine first and second motion vector predictors (MVPs);

determine complete motion vector difference (MVD) information of a current block within a current picture using the first and second MVPs and first and second motion vectors, wherein the complete MVD information includes complete magnitude information for first and second MVDs and sign information for the first and second MVDs, the complete magnitude information includes magnitudes of x- and y-components of the first and second MVDs, and the sign information includes the signs of the x- and y-components of the first and second MVDs;

determine partial MVD information of the current block based on the complete MVD information;

determine that the current picture has a first reference picture with a picture order count (POC) smaller than a POC of the current picture and a second reference picture with a POC smaller than the POC of the current picture; and encode the partial MVD information in a coded video bitstream if the current picture has the first and second reference pictures.

* * * * *